United States Patent [19]

Iwase et al.

[11] Patent Number: 5,718,984
[45] Date of Patent: Feb. 17, 1998

[54] METHOD OF RECOVERING ELECTROLYTE MEMBRANE FROM FUEL CELL AND APPARATUS FOR THE SAME

[75] Inventors: Masayoshi Iwase; Shigeyuki Kawatsu, both of Susono, Japan

[73] Assignee: Toyota Jidosha Kabushiki Kaisha, Toyota, Japan

[21] Appl. No.: 564,624

[22] Filed: Nov. 29, 1995

[30] Foreign Application Priority Data

Dec. 15, 1994 [JP] Japan .................... 6-334355

[51] Int. Cl.$^6$ ..................................... H01M 6/50
[52] U.S. Cl. ........................................... 429/49
[58] Field of Search .................. 429/49; 422/297, 422/300

[56] References Cited

U.S. PATENT DOCUMENTS

| | | | |
|---|---|---|---|
| 4,316,789 | 2/1982 | Lijima et al. | 204/296 |
| 4,399,009 | 8/1983 | Chisholm | 205/521 |
| 4,661,218 | 4/1987 | Oda et al. | 204/98 |
| 5,133,843 | 7/1992 | Eisman | 204/105 R |

FOREIGN PATENT DOCUMENTS

| | | |
|---|---|---|
| 58-166651 | 10/1983 | Japan . |
| 60-3864 | 1/1985 | Japan . |
| 60-20472 | 2/1985 | Japan . |
| 63-166937 | 7/1988 | Japan . |

OTHER PUBLICATIONS

Journal of the Electrochemical Society, vol. 140, No. 10, pp. 2872-2877, Oct. 1993, Mahlon S. Wilson, et al., "Surface Area Loss Of Supported Platinum In Polymer Electrolyte Fuel Cells".

Journal of Membrane Science, vol. 73, No. 1, pp. 87-97, Oct. 1992, Ruldolf Holze, et al., "Advances in the Use of Perfluorinated Cation Exchanged Membranes in Integrated Water Electrolysis and Hydrogen/Oxygen Fuel Cell Systems".

Primary Examiner—Kathryn L. Gorgos
Assistant Examiner—Alex Noguerola
Attorney, Agent, or Firm—Oblon, Spivak, McClelland, Maier & Neustadt, P.C.

[57] ABSTRACT

The method of the present invention allows used electrolyte membranes to be easily recovered from fuel cells of relatively simple structure. A stack of polymer electrolyte fuel cells (10) is decomposed into unit cells (20), each unit cell (20) consisting of an electrolyte membrane 11 and electrodes (12,13). Each unit cell (20) is soaked in a soaking tank (51) filled with methanol and left for approximately ten minutes (see FIG. 5A). The soaking process substitutes water included in the electrolyte membrane (11) of the unit cell (20) by methanol and expands and deforms the electrolyte membrane (11), thereby dissolving a solid material caused by a proton-conductive polymer electrolyte solution working as an adhesive of joining the electrolyte membrane (11) with the electrodes (12,13). This weakens the adhesive forces at the interfaces between the electrolyte membrane (11) and the electrodes (12,13) and makes the electrolyte membrane (11) easily separable from the electrodes (12,13). After the electrolyte membrane (11) is separated from the electrodes (12,13) in a separation tank (53) (see FIG. 5B), the separated electrolyte membrane (11) is soaked in a substitution tank (55) filled with water (see FIG. 5C). Methanol included in the separated electrolyte membrane (11) is again substituted by water in the substitution tank (55). After the substitution, the electrolyte membrane (11) is placed in a wash tank (57) filled with aqueous hydrogen peroxide for cleaning (see FIG. 5D).

34 Claims, 17 Drawing Sheets

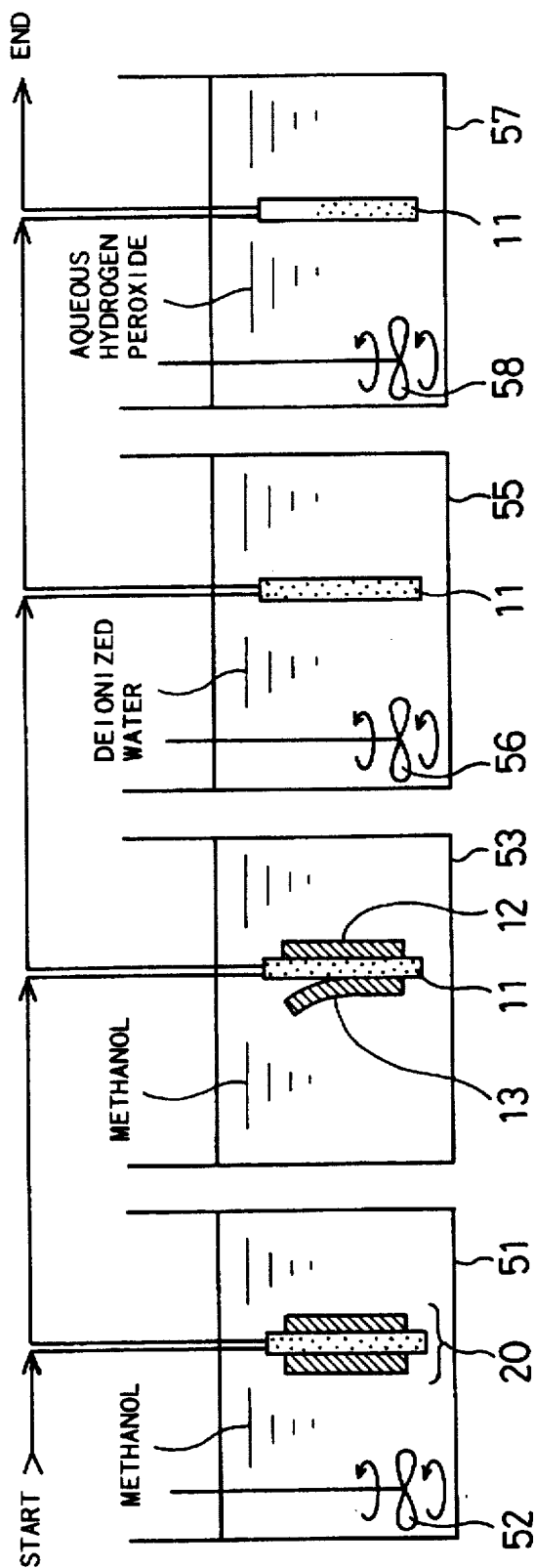

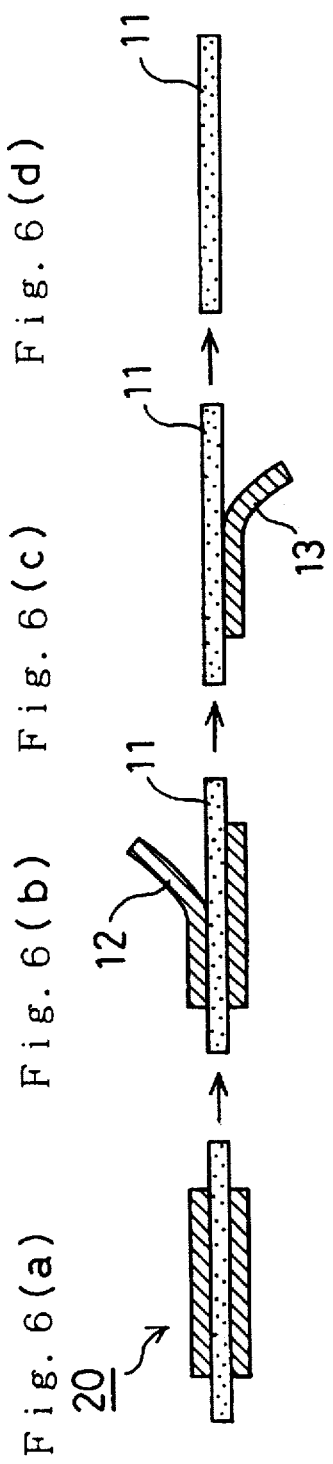

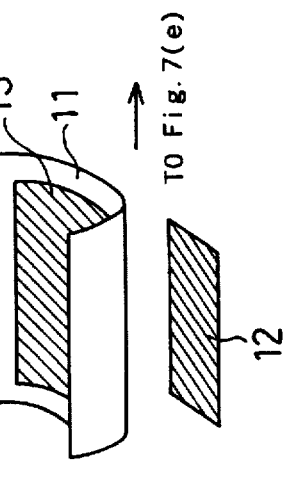
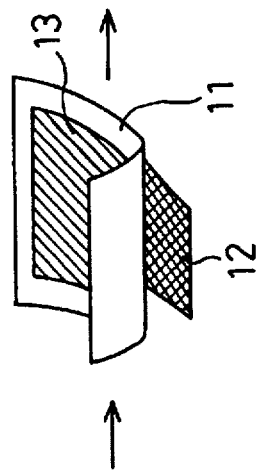
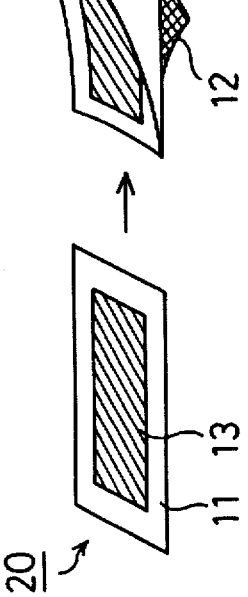
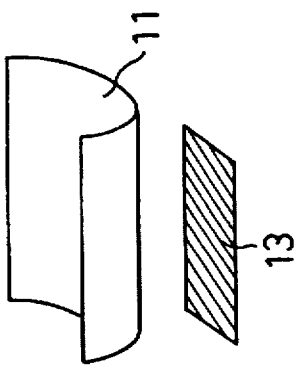
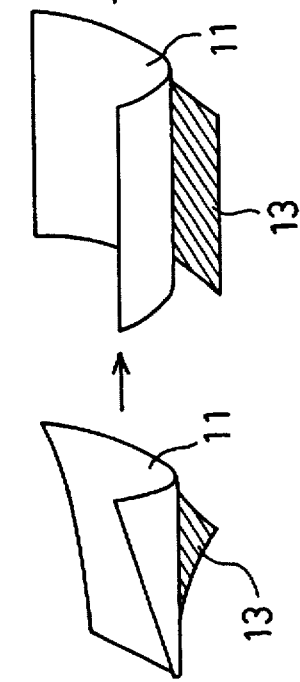
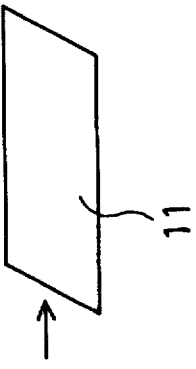

METHOD OF RECOVERING ELECTROLYTE MEMBRANE FROM FUEL CELL AND APPARATUS FOR THE SAME

BACKGROUND OF THE INVENTION

1. Field of the Invention

The present invention relates to a method of recovering an electrolyte membrane from an unit cell included in a stack of fuel cells, in which the unit cell includes an electrolyte membrane and electrodes. The invention also pertains to an apparatus for the same.

2. Description of the Related Art

Fuel cells are known apparatus in which the chemical energy of a fuel is converted directly into electrical energy. Each fuel cell generally includes a pair of electrodes arranged across an electrolyte, wherein the surface of one electrode is exposed to a gaseous fuel, such as gaseous hydrogen, while the surface of the other electrode being exposed to an oxidizing gas containing oxygen. The electrical energy is generated between the electrodes through the electrochemical reactions proceeding by the exposure. The fuel cells receiving continuous supplies of gaseous fuel and oxygen-containing gas generate electrical energy at high efficiency.

In commercial applications of such fuel cells under the resource-saving and low-cost condition, it is essential to recycle and reuse at least part of these fuel cells. Decomposition of fuel cells and recovery of reusable parts are, however, rather difficult since the respective parts in the fuel cells are easily stuck to one another. A stack of fuel cells is generally prepared by laminating a plurality of unit cells, each including an electrolyte membrane and a pair of electrodes, and clamping and fixing the unit cells under a predetermined clamping pressure. This manufacturing process accelerates the fixing of the constituents in the fuel cells.

The technique proposed in JAPANESE PATENT LAYING-OPEN GAZETTE No. 60-20472 gives easily decomposable fuel cells by interposing separable layers between an electrolyte and electrodes or between electrodes and outer parts, such as separators. Easy decomposition of fuel cells allows precious metals like platinum and other expensive parts to be recovered efficiently.

The prior art technique requires additional parts like separable layers and makes the structure of fuel cells undesirably complicated. The complicated structure consumes much time and labor for the decomposition of such fuel cells. Use of the additional parts for recycling other parts deviates from the original concept of resource-saving.

The prior art technique described above aims at the recovery of precious metals, such as platinum, and does not involve the recovery of electrolyte membranes. Recovery of electrolyte membranes has highly been demanded, especially in polymer electrolyte fuel cells, since the electrolyte membranes are more expensive than platinum and are not easily processed for disposal. Polymer electrolyte fuel cells are still in course of development and has not yet gone into mass production in a commercial scale. Only a few sets of such fuel cells are in service and these fuel cells have been operated only for a restricted time period. No problems have thus arisen in the disposal of electrolyte membranes. There have been no studies on the technique of recovering electrolyte membranes from polymer electrolyte fuel cells.

SUMMARY OF THE INVENTION

The object of the present invention is to allow an electrolyte membrane to be easily recovered from fuel cells of relatively simple structure.

The above and the other related objects are realized by a method of recovering an electrolyte membrane from an unit cell of fuel cells. The method comprises the steps of:

(a) providing the unit cell comprising the electrolyte membrane and an electrode which are joined with each other, (b) soaking the unit cell in a liquid having an ability of expanding the electrolyte membrane by a factor greater than a predetermined value; and (c) separating the electrolyte membrane from the electrode of the unit cell after execution of the step (b).

The method of the invention soaks an unit cell comprising an electrolyte membrane and an electrode in a predetermined liquid at step (b). The predetermined liquid has an ability of expanding the electrolyte membrane by a factor greater than a predetermined value. The liquid expands and deforms the electrolyte membrane and weakens the adhesive force at the interface between the electrolyte membrane and the electrode of an unit cell, thereby making the electrolyte membrane easily separable from the electrode. At subsequent step (c), the expanded electrolyte membrane is separated from the electrode of the unit cell. The method of the invention allows the electrolyte membrane to be easily separated and recovered from the unit cell.

According to one preferable structure, the method further comprises the steps of:

(d) substituting the liquid included in the separated electrolyte membrane by water after execution of the step (c); and (e) washing the electrolyte membrane after execution of the step (d).

In this structure, the liquid included in the electrolyte membrane separated in the step (c) is substituted by water at step (d), and the electrolyte membrane is then washed at step (e). This structure allows the liquid introduced into the electrolyte membrane in the step (b) to be efficiently removed from the electrolyte membrane. This method realizes the recovery of electrolyte membranes under the reusable condition.

It is preferable that the step (c) further comprises the step of:

(c-1) executing one operation selected among the group consisting of: peeling the electrode off the electrolyte membrane; twisting the electrode relative to the electrolyte membrane; shifting the electrode relative to the electrolyte membrane; and rotating the electrode with respect to the electrolyte membrane.

This method easily separates the electrolyte membrane from the electrode without doing any damage to the electrolyte membrane only by peeling the electrode off the electrolyte membrane or otherwise twisting, shifting, or rotating the electrode with respect to the electrolyte membrane. This preferable structure further ensures the easy recovery of electrolyte membrane.

It is also preferable that the step (b) further comprises the step of:

(b-1) applying a vibrating force to the liquid, in which the unit cell is soaked.

Vibrating the liquid, in which unit cell is soaked, allows the space between the electrolyte membrane and the electrode of the unit cell to be filled with the liquid in a short time period. This shortens the time period required for weakening the adhesive force of joining the electrolyte membrane with the electrode and realizes the easier recovery of electrolyte membranes.

In accordance with one application of the invention, the method further comprises the step of:

(f) drying the unit cell prior to execution of the step (b).

This structure dries an unit cell prior to the step (b), thus increasing the degree of expansion of the electrolyte membrane soaked in the liquid at step (b). This enhances the action of weakening the adhesive force of joining the electrolyte membrane with the electrode at step (b) and ensures the easy separation of the electrolyte membrane from the electrode at step (c). The water content included in the electrolyte membrane has been removed prior to the step (b). The previous removal of the water content makes the liquid free from contamination with water included in the electrolyte membrane at step (b), thus not lowering the concentration of the liquid used in the step (b). This reduces the frequency of replacement of the liquid used in the step (b).

In accordance with another application of the invention, the method further comprises the steps of:

(g) irradiating the electrolyte membrane with a light beam of a predetermined wavelength range after execution of the step (e);

(h) measuring an intensity of the transmitted light through the electrolyte membrane; and (i) repeating the step (d) and (e) when the measured intensity of light dose not meet a predetermined criterion.

Different liquids show different absorption behaviors for the light bee of a predetermined wavelength range. Irradiation of the electrolyte membrane with such a light beam shows which solution is included in the electrolyte membrane. When the measured intensity of light dose not meet a predetermined criterion, the step (d) and (e) are repeated. This structure ensures the complete substitution and washing.

The method of the invention may further comprises the step of:

(j) filtering the liquid to recover platinum in the liquid after execution of the step (b).

This method filters the liquid used in the step (b) to recover platinum. This method realizes recycle of platinum in combination with recycle of electrolyte membranes, which is characteristic of the invention, thereby further reducing the manufacturing cost of polymer electrolyte fuel cells.

The invention is also directed to another method of recovering an electrolyte membrane from an unit cell of fuel cells. The method comprises the steps of:

(a) providing the unit cell comprising the electrolyte membrane and an electrode which are joined with each other while using a proton-conductive solution, (b) soaking the unit cell in a liquid having an ability of dissolving a solid material of the proton-conductive solution; and (c) separating the electrolyte membrane from the electrode of the each unit cell after execution of the step (b).

The unit cell comprising the electrolyte membrane and the electrode joined with each other while using a proton-conductive solution is soaked in a predetermined liquid at step (b). The predetermined liquid has an ability of dissolving a solid material of the proton-conductive solution. The liquid accordingly weakens the adhesive force at the interface between the electrolyte membrane and the electrode of unit cell and makes the electrolyte membrane easily separable from the electrode. At subsequent step (c), the electrolyte membrane is separated from the electrode of the unit cell. This method of the invention allows electrolyte membrane to be easily separated and recovered from the unit cell.

It is preferable that the liquid has an ability of expanding the electrolyte membrane by a factor greater than a predetermined value in addition to the ability of dissolving the solid material of the proton-conductive solution.

The liquid works to expand and deform the electrolyte membrane simultaneously with dissolving the solid material caused by the proton-conductive solution. These abilities of the liquid further weakens the adhesive force at the interface between the electrolyte membrane and the electrode of the unit cell, thereby assuring the easier separation of the electrolyte membrane from the electrode. This method allows the electrolyte membrane to be separated and recovered from the unit cell more easily. The liquid may be methanol.

It is preferable that the method further comprises the steps of:

(d) substituting the liquid included in the separated electrolyte membrane by water after execution of the step (b); and (e) washing the electrolyte membrane after execution of the step (d).

According to another aspect of the invention, the method of recovering electrolyte membranes from fuel cells comprises the steps of:

(a) providing a stack of fuel cells comprising a plurality of unit cells under a predetermined clamping pressure, each unit cell comprising an electrolyte membrane and an electrode which are joined with each other, the stack of fuel cells comprising a flow path having an inlet and outlet for supplying a reactant gas to the electrodes, the flow path acting as a gas seal with the aid of the clamping pressure;

(b) reducing the clamping pressure while maintaining the gas seal;

(c) closing the outlet of the flow path;

(d) introducing a liquid having an ability of expanding the electrolyte membranes by a factor greater than a predetermined value, into the stack of fuel cells via the inlet of the flow path; and (e) opening the outlet of the gas flow path.

The liquid works to make the electrolyte membranes easily separable from the electrodes in the process of decomposing the stack of fuel cells. The clamping pressure is reduced while maintaining the gas seal prior to injection of the liquid into the stack of fuel cells. This weakens the adhesive force of joining the electrolyte membrane with the electrode and allows the liquid to accelerate the easy separation of the electrolyte membrane from the electrode, while preventing leakage of the liquid. This method implements the soaking process without decomposing the stack of fuel cells, thus protecting the electrolyte membranes from damages and allowing the electrolyte membranes of preferable condition to be easily recovered.

According to still another aspect of the invention, the method of recovering electrolyte membranes from fuel cells comprises the steps of:

(a) providing a stack of fuel cells comprising a plurality of unit cells under a predetermined clamping pressure, each unit cell comprising an electrolyte membrane and an electrode which are joined with each other while using a proton-conductive solution, the stack of fuel cells comprising a flow path having an inlet and outlet for supplying a reactant gas to the electrodes, the flow path acting as a gas seal with the aid of the clamping pressure;

(b) reducing the clamping pressure while maintaining the gas seal;

(c) closing the outlet of the flow path;

(d) introducing a liquid having abilities of dissolving a solid material caused by the proton-conductive solution and expanding the electrolyte membranes by a factor greater than a predetermined value, into the stack of fuel cells via the inlet of the flow path; and (e) opening the outlet of the gas flow path.

This method has the same effects as those described above. Since the liquid has the ability of dissolving a solid material caused by the proton-conductive solution in addition to the ability of expanding the electrolyte membranes by a factor greater than a predetermined value, the electrolyte membranes are separable from the electrodes more easily.

The above objects are also realized by an apparatus for recovering an electrolyte membrane from an unit cell of fuel cells, the unit cell comprising the electrolyte membrane and an electrode which are joined with each other. The apparatus comprises:

a soaking tank filled with a liquid having an ability of expanding the electrolyte membrane by a factor greater than a predetermined value, the unit cell being soaked in the liquid in the soaking tank; and separating means for separating the electrolyte membrane from the electrode of the unit cell soaked in the soaking tank.

The invention is also directed to an apparatus for recovering an electrolyte membrane from an unit cell of fuel cells, the unit cell comprising the electrolyte membrane and an electrode which are joined with each other while using a proton-conductive solution. The apparatus comprises:

a soaking tank filled with a liquid having an ability of dissolving a solid material caused by the proton-conductive solution, the unit cell being soaked in the liquid in the soaking tank; and separating means for separating the electrolyte membrane from the electrode of the unit cell soaked in the soaking tank.

The invention is further directed to an apparatus for recovering an electrolyte membrane from an unit cell of fuel cells. The apparatus comprises liquid tank means filled with a liquid having predetermined properties, the unit cell comprising the electrolyte membrane and an electrode and being soaked in the liquid tank means, wherein the liquid tank means comprises a plurality of tanks connected in series via piping means, a supply source of the liquid being connected to a last tank among the plurality of tanks along a feeding path of the unit cell, and the liquid overflowing an arbitrary tank among the plurality of tanks being introduced into a preceding tank along the feeding path of the unit cell.

These and other objects, features, aspects, and advantages of the present invention will become more apparent from the following detailed description of the preferred embodiments with the accompanying drawings.

BRIEF DESCRIPTION OF THE DRAWINGS

FIG. 5 schematically illustrates the varying state of each electrolyte membrane 11 in the recovering process;

FIG. 6 schematically illustrates a peel-off operation in the separating process;

FIG. 7 schematically illustrates a twisting operation applicable to the separating process;

DESCRIPTION OF THE PREFERRED EMBODIMENTS

Figure 1:
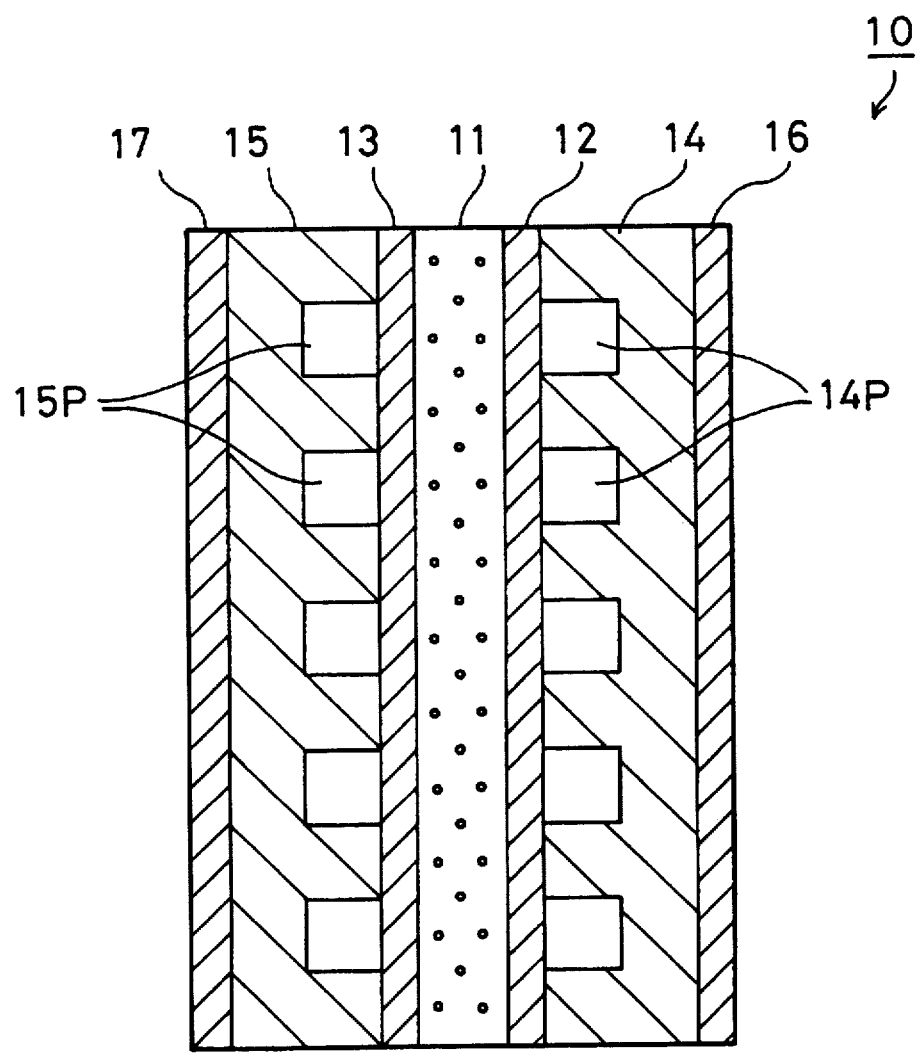
FIG. 1 shows a unit cell structure of polymer electrolyte fuel cells 10, to which a method of recovering an electrolyte membrane from each fuel cell is applied as a first embodiment according to the present invention.
Figure 2:
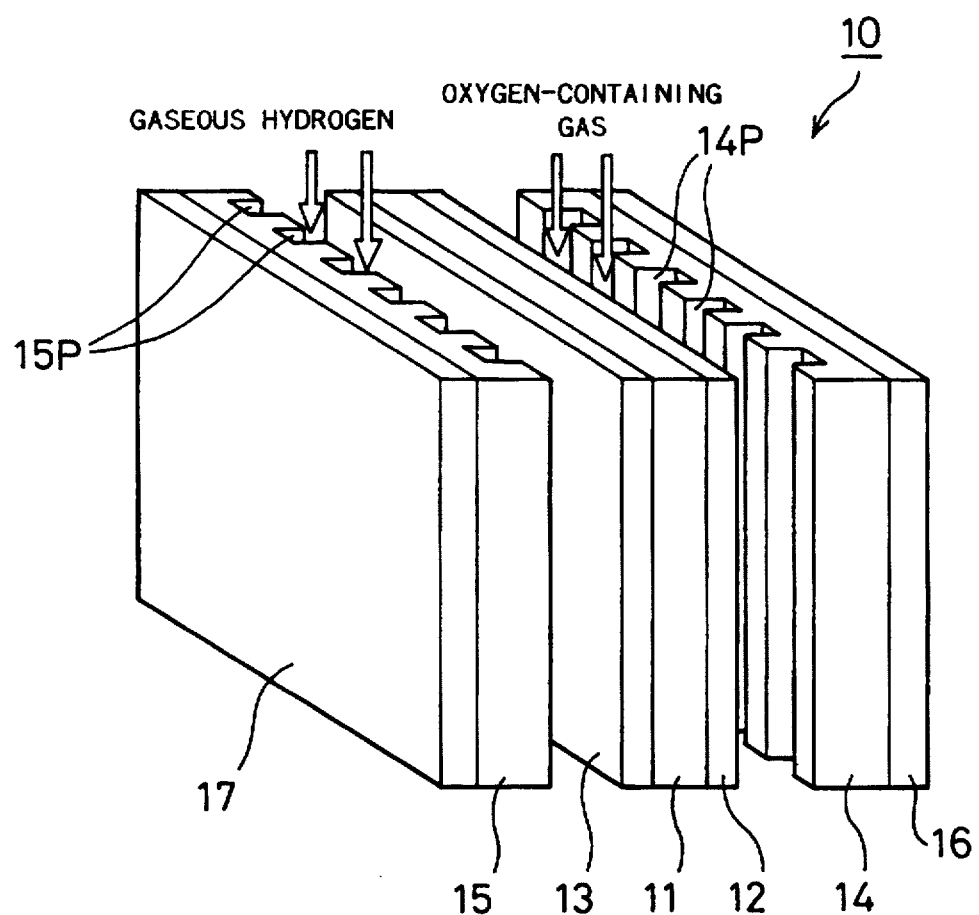
FIG. 2 is a decomposed perspective view illustrating the unit cell of the polymer electrolyte fuel cells 10.

The following description regards an unit cell structure of a stack of polymer electrolyte fuel cells 10, to which a method of recovering an electrolyte membrane from each fuel cell is applied as a first embodiment according to the present invention. For the clarity of explanation, it is assumed that the stack of polymer electrolyte fuel cells 10 consists of only one unit cell, and numeral '10' denotes the polymer electrolyte fuel cell in the description below. FIG. 1 shows a unit cell structure of the polymer electrolyte fuel cell 10, and FIG. 2 is a decomposed perspective view illustrating the polymer electrolyte fuel cell 10. As clearly seen in these drawings, the polymer electrolyte fuel cell (hereinafter referred to simply as fuel cell) 10 includes an electrolyte membrane 11, a cathode 12 and an anode 13 arranged across the electrolyte membrane 11 to form a sandwich structure and work as gas diffusion electrodes, first and second separators 14 and 15 disposed across the sandwich structure (hereinafter may be referred to as the joint structure) and combined with the cathode 12 and the anode 13 to constitute flow paths of oxidizing gas and gaseous fuel, and first and second current collectors 16 and 17 disposed respectively outside the first and the second separators 14 and 15 to work as current-collecting electrodes of the cathode 12 and the anode 13.

The electrolyte membrane 11 is constructed as an ion-exchange membrane composed of a polymer material, such as fluororesin, and shows a favorable electrical conductivity under the wet conditions. The cathode 12 and the anode 13 are made of carbon cloth woven of carbon fibers, wherein carbon powder with platinum catalyst or platinum-containing alloy catalyst supported thereon is applied to the surface of the carbon cloth.

The cathode 12 and the anode 13 are joined with the electrolyte membrane 11 in the following manner. Carbon powder with platinum catalyst or platinum-containing alloy catalyst supported thereon is applied to the surface of the carbon cloth, which is used as base material of the cathode 12. The electrolyte membrane 11 and the surface of the carbon cloth are joined with each other via a proton-conductive polymer electrolyte solution, for example, one sold under the trade name of Nafion Solution by Aldrich Chemical Corp., the U.S.A. The proton-conductive polymer electrolyte solution works as an adhesive in its curing process to bond the cathode 12 to the surface of the electrolyte membrane 11. The anode 13 is joined with the surface of the electrolyte membrane 11 in the same manner as above. The cured proton-conductive polymer electrolyte allows water as well as hydrogen and oxygen to pass therethrough. The surface of the electrolyte membrane 11 covered with the cured proton-on-conductive polymer electrolyte accordingly does not cause any troubles or problems.

Carbon powder with platinum catalyst supported thereon is prepared according to the following process. An aqueous solution of chloroplatinic acid is mixed with sodium thiosulfate to yield an aqueous solution of platinum sulfite complex. Hydrogen peroxide is added dropwise to the aqueous solution of platinum sulfite with stirring, so that platinum colloidal particles are deposited in the aqueous solution. Carbon black working as a support is then added to the aqueous solution with stirring, so that the platinum colloidal particles adhere to the surface of carbon black. Available examples of carbon black include Vulcan XC-72 (trade name by CABOT Corp., the U.S.A.) and Denka Black (trade name by DENKI KAGAKU KOGYO K.K, Japan). The carbon black with platinum particles adhering thereto is separated by filtration under reduced pressure or by pressure filtration of the aqueous solution, washed repeatedly with deionized water or pure water, and completely dried at room temperature. The dried carbon black aggregate is ground with a grinder, and heated in a reducing hydrogen atmosphere at 250° C. through 350° C. for approximately 2 hours in order to reduce platinum on the carbon black and completely remove the remaining chlorine.

The first and the second separators 14 and 15 are made of dense carbon plates. The first separator 14 close to the cathode 12 is combined with the surface of the cathode 12 to form oxygen-containing gas flow paths 14P for allowing passage of an oxygen-containing oxidizing gas as well as water produced on the cathode 12. The second separator 15 close to the anode 13 is combined with the surface of the anode 13 to form gaseous fuel flow paths 15P for allowing passage of a mixture of gaseous hydrogen or gaseous fuel and water vapor.

The first and the second current collectors are composed of copper (Cu).

Figure 3:
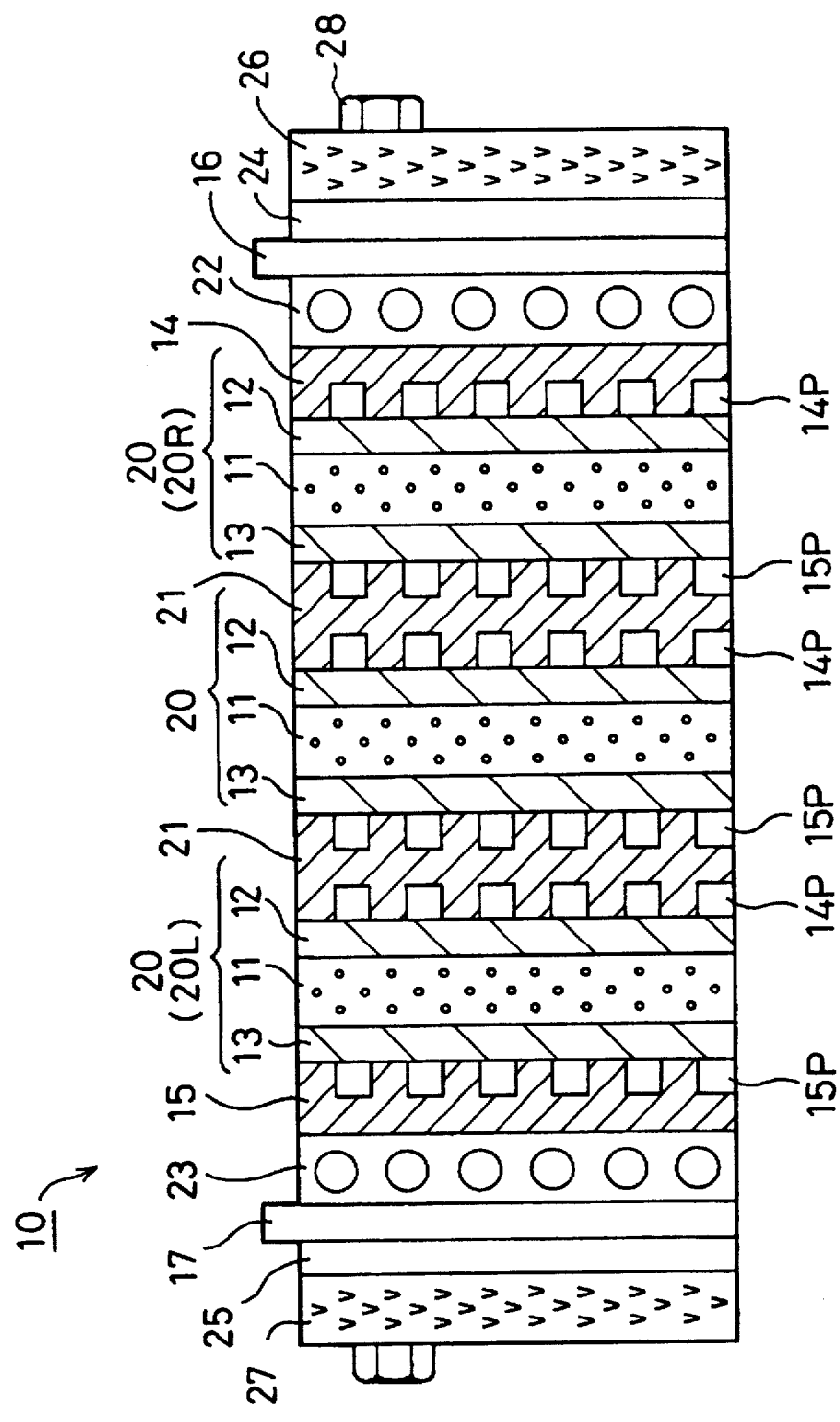
FIG. 3 schematically illustrates a structure of the polymer electrolyte fuel cells 10 actually used.

This is the fundamental structure of each cell unit in the polymer electrolyte fuel cells 10. FIG. 3 schematically illustrates a structure of the polymer electrolyte fuel cells 10 actually used. In the drawing of FIG. 3, the same constituents as those in FIGS. 1 and 2 are given by the like numerals.

As shown in FIG. 3, the polymer electrolyte fuel cells 10 include a plurality of cell units 20, which are laminated and superposed one upon another via separators 21. Each cell unit 20 includes an electrolyte membrane 11, a cathode 12, and an anode 13 shown in FIGS. 1 and 2. The separators 21 are composed of the same material as the first separator 14 and the second separator 15 of the unit fuel cell shown in FIGS. 1 and 2. Each separator 20 is combined with the surface of the anode 13 of one adjacent cell unit 20 to constitute the oxygen-containing gas flow paths 14P, while being combined with the surface of the cathode 12 of the other adjacent cell unit 20 to constitute the gaseous fuel flow paths 15P. A first separator 14 is disposed immediately outside a right-most cell unit 20R in the drawing to constitute only the oxygen-containing gas flow paths 14P. A second separator 15 is, on the other hand, disposed immediately outside a left-most joint unit 20L in the drawing to constitute only the gaseous fuel flow paths 15P.

The polymer electrolyte fuel cells 10 further include: a pair of coolant flow paths 22 and 23 respectively arranged outside the first and the second separators 14 and 15; a pair of current collectors 16 and 17 respectively disposed outside the coolant flow paths 22 and 23; a pair of end plates 26 and 27 arranged via insulating plates 24 and 25 as outer-most layers to support all the above structural elements; and a pair of clamping bolts 28 for clamping and locking the end plates 26 and 27.

A method of recovering the electrolyte membranes 11 from the polymer electrolyte fuel cells 10 thus constructed is described in detail. This method involves the process of recovering the electrolyte membrane 11 from each unit cell 20, which consists of the electrolyte membrane 11, the cathode 12, and the anode 13 and is prepared by unlocking the clamping bolts 28 and removing the separators 14, 15, and 21, the coolant flow paths 22 and 23, the current collectors 16 and 17, the insulating plates 24 and 25, and the end plates 26 and 27.

Figure 4:
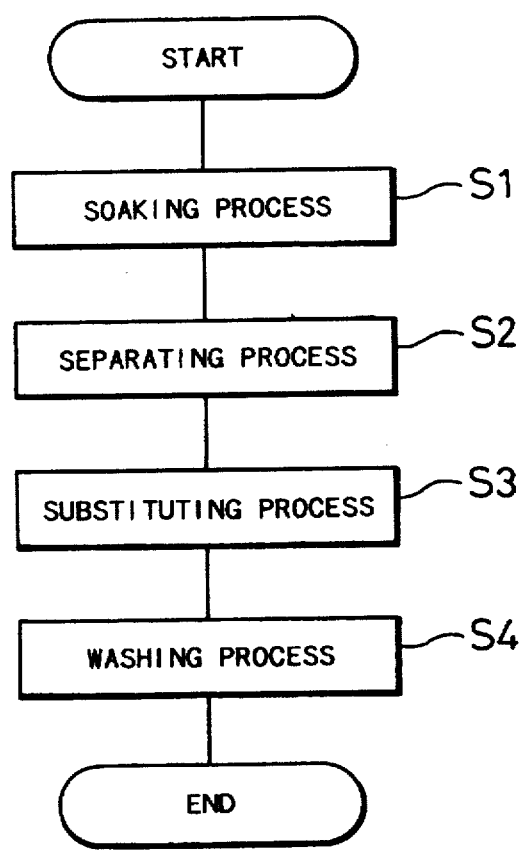
FIG. 4 is a flowchart showing a process routine of recovering electrolyte membranes from the fuel cells 10 thus constructed.

FIG. 4 is a flowchart showing a process routine of recovering electrolyte membranes, and FIG. 5 schematically illustrates the varying state of the electrolyte membrane 11 in the recovering process. When the program enters the routine in the flowchart of FIG. 4, a soaking process is carried out at step S1; each cell unit 20 of the polymer electrolyte fuel cells 10 is soaked in a methanol solution. According to a concrete procedure, each cell unit 20 is soaked in a soaking tank 51 filled with methanol for 1 to 10 minutes as shown in FIG. 5(A). This makes the cell unit 20 sufficiently impregnated with methanol and allows water molecules in the electrolyte membrane 11 to be completely substituted by methanol molecules.

The substitution of methanol for water in the electrolyte membrane 11 expands and deforms the electrolyte membrane 11 and finally dissolves the cured proton-conductive polymer electrolyte working as an adhesive for joining the electrolyte membrane 11 with the cathode 12 and the anode 13. This weakens the adhesive force at the interface between the electrolyte membrane 11 and the cathode 12 and the same at the interface between the electrolyte membrane 11 and the anode 13 in each unit cell 20. The weakened adhesive force makes the electrolyte membrane 11 easily separable from the cathode 12 and the anode 13. In the soaking process, it is preferred that methanol in the soaking tank 51 is stirred with a stirrer 52. Stirring in the soaking tank 51 completes the soaking process in a shorter time period.

The program then proceeds to step S2 at which a separating process is carried out; the cathode 12 and the anode 13 in each cell unit 20 under the easily separable condition are separated from the electrolyte membrane 11. According to a concrete procedure, the unit cell 20 is transferred from the soaking tank 51 to a subsequent separation tank 53, which is also filled with methanol, as shown in FIG. 5(B). The cathode 12 and the anode 13 are separated from the electrolyte membrane 11 in the separation tank 53 by the method described below in this embodiment.

FIG. 6 schematically illustrates a peel-off operation in the separating process. The cathode 12 of each unit cell 20 shown in FIG. 6(a) is peeled off one side of the electrolyte membrane 11 as shown in FIG. 6(b). The anode 13 is then peeled off the other side of the electrolyte membrane 11 as shown in FIG. 6(c). This makes the electrolyte membrane 11 separated from both the cathode 12 and the anode 13 as shown in FIG. 6(d). Although the cathode 12 and the anode 13 are peeled off the electrolyte membrane 11 in this order in the first embodiment, the anode 13 may be peeled off prior to the cathode 12.

The operation of peeling the cathode 12 and the anode 13 off the electrolyte membrane 11 does not require a large force in this separating process at step S2. Since the soaking process of step S1 makes the electrolyte membrane 11 easily separable from the cathode 12 and the anode 13, the cathode 12 and the anode 13 are easily peeled off the electrolyte membrane 11 with a spatula or the like.

Referring back to the flowchart of FIG. 4, after the separating process of step S2, the program proceeds to step S3 at which a substituting process is carried out; methanol included in the electrolyte membrane 11 separated in the separating process is substituted by water. According to a concrete procedure, the separated electrolyte membrane 11 is transferred from the separation tank 53 to a subsequent substitution tank 55, which is filled with deionized water, and soaked in the substitution tank 55 for 1 to 10 minutes as shown in FIG. 5(C). This makes the electrolyte membrane 11 sufficiently impregnated with deionized water and allows methanol in the electrolyte membrane 11 to be completely substituted by water. In the substituting process, it is preferred that deionized water in the substitution tank 55 is stirred with a stirrer 56. Stirring in the substitution tank 55 completes the substitution of water for methanol in the electrolyte membrane 11 in a shorter time period.

Referring back again to the flowchart of FIG. 4, after the substituting process of step S3, the program proceeds to step S4 at which a washing process is carried out; the electrolyte membrane 11 with substituted water is washed with aqueous hydrogen peroxide. According to a concrete procedure, the electrolyte membrane 11 is transferred from the substitution tank 55 to a subsequent wash tank 57, which is filled with aqueous hydrogen peroxide, and washed with boiled aqueous hydrogen peroxide in the wash tank 57 as shown in FIG. 5(D). After the washing process with boiled aqueous hydrogen peroxide, the electrolyte membrane 11 is repeatedly washed with deionized water (not shown). The completely washed electrolyte membrane 11 is stored in a vessel filled with an atmosphere of saturated water vapor at room temperature. This is the whole process of recovering the electrolyte membranes 11 from the stack of polymer electrolyte fuel cells 10. In the washing process, it is preferred that aqueous hydrogen peroxide in the wash tank 57 is stirred with a stirrer 58. Stirring in the wash tank 57 completes the wash of the electrolyte membrane 11 with boiled aqueous hydrogen peroxide in a shorter time period.

The electrolyte membranes 11 actually recovered by the method of the first embodiment were tested and evaluated for deterioration. The results of evaluation are given below.

The surface of each recovered electrolyte membrane 11 was observed with a microscope of 10× to 100× magnification. No defects or pinholes due to any of the soaking, separating, substituting, and washing processes were observed on either the front surface or the rear surface of the electrolyte membranes 11. This means that the series of processes including the soaking, separating, substituting, and washing processes did not have any physical effects on the electrolyte membranes 11 and that the electrolyte membranes 11 recovered were in good conditions.

Each recovered electrolyte membrane 11 was then joined with unused cathode 12 and anode 13 to form a unit cell 20. The preparation of a unit cell 20 with the recovered electrolyte membrane 11 was carried out under the same conditions as those in preparation with a new electrolyte membrane 11. In the unit cell 20 thus prepared, the recovered electrolyte membrane 11 was joined with the cathode 12 and the anode 13 by a sufficient strength. The resistance of the unit cell 20 with the recovered electrolyte membrane 11 was comparable to that of the unit cell 20 with the new electrolyte membrane 11. The joining process for the unit cell 20 with the recovered electrolyte membrane 11 was identical with that for the unit cell 20 with the new electrolyte membrane 11.

The unit cells 20 prepared with the recovered electrolyte membranes 11 were assembled to constitute an actual stack of fuel cells. The physical properties of such fuel cells were measured, while gaseous hydrogen and an oxygen containing gas were respectively fed to the anodes and the cathodes in the fuel cells. The physical properties of the fuel cells with the recovered electrolyte membranes 11 were comparable to those of fuel cells with new electrolyte membranes 11.

The results of the measurements and evaluation prove that electrolyte membranes can be recovered from unit cells of polymer electrolyte fuel cells, wherein each unit cell consists of an electrolyte membrane, an anode and a cathode and that the recovered electrolyte membranes can be used to prepare other unit cells. This means that electrolyte membranes can be recycled.

As described previously, the method of recovering electrolyte membranes from fuel cells according to the first embodiment expands and deforms each electrolyte membrane 11 in the soaking process of step S1. The soaking process dissolves the cured proton-conductive polymer electrolyte working as an adhesive for joining the electrolyte membrane 11 with the cathode 12 and the anode 13. This weakens the adhesive force at the interface between the electrolyte membrane 11 and the cathode 12 and the same at the interface between the electrolyte membrane 11 and the anode 13 in each unit cell 20. The weakened adhesive force makes the electrolyte membrane 11 easily separable from the cathode 12 and the anode 13. The method of the first embodiment allows the electrolyte membranes 11 to be easily recovered from the polymer electrolyte fuel cells 10 without any specific means attached to the polymer electrolyte fuel cells 10.

In this embodiment, the soaking tank 51, in which the unit cells 20 are soaked in the soaking process, is filled with methanol. The liquid used in the soaking process is required to have sufficient abilities of expanding the electrolyte membranes 11 (expanding at an expansion coefficient of not less than 20[%] and dissolving the cured proton-conductive polymer electrolyte. Available examples with such abilities are not restricted to methanol but include other alcohols, such as ethanol and isopropyl alcohol, and ketones, such as acetone. Only a restricted range of liquids are, however, used in actual procedures by considering economical and discharge advantages and recycling possibility.

In this embodiment, water in the substituting process is contaminated with the liquid previously used in the soaking process. Some liquids used in the soaking process prevent the direct discharge of water contaminated with the liquids in the substituting process. A mixture of methanol in the soaking process and water in the substituting process may be used as a supply of raw material fed to a methanol reformer, which is a source of feeding a gaseous fuel to the polymer electrolyte fuel cells 10. Based on these data, methanol is an especially preferable selection in the soaking process, although other alcohols, such as ethanol and isopropyl alcohol, and ketones, such as acetone, may be used instead.

Solutions having distinct ability of expanding the electrolyte membranes 11 but no ability of dissolving the cured proton-conductive polymer electrolyte may also be used in the soaking process. Such solutions are required to have the expansion coefficient of not less than 20[%] or preferably not less than 30[%]. Solutions with the greater expansion coefficient can sufficiently expand and deform each electrolyte membrane 11 to weaken the adhesive forces of joining the electrolyte membrane 11 with the cathode 12 and the anode 13. Solutions having the ability of dissolving the cured proton-conductive polymer electrolyte but no ability of expanding the electrolyte membranes 11 may alternatively be used in the soaking process.

A mixed solution of methanol and water may also be applicable to the soaking process. Although the mixture of methanol and water is expected to reduce the material cost in the soaking process and enhance the substitution of methanol by water in the substituting process, water has no ability of dissolving the cured proton-conductive polymer electrolyte and significantly weaker ability of expanding the electrolyte membrane 11. Water included in the mixed solution may accordingly prevent the adhesive forces of joining the electrolyte membrane 11 with the cathode 12 and the anode 13 from being sufficiently weakened in the soaking process, thereby making it difficult to separate the electrolyte membrane 11 from the cathode 12 and the anode 13. The recovering process was tested with the varying ratio of methanol to water. The greater ratio of water increases the time required in the separating process. The results of testing show that the preferable ratio of methanol to water is not less than 3 to 10.

In the separating process of step S2 in the first embodiment, the cathode 12 and the anode 13 (electrodes) are separated from the electrolyte 11 by the peel-off operation. These electrodes may, however, be separated from the electrolyte 11 by a twisting, shifting, or rotating operation as described below.

FIG. 7 schematically illustrates a twisting operation applicable to the separating process. Each cell unit 20 is arranged horizontally with the cathode 12 facing down as shown in FIG. 7(a), since the cathode 12 is removed first from the electrolyte membrane 11 in this example. The four corners of the electrolyte membrane 11 are successively turned up as shown in FIGS. 7(b) and 7(c). While the electrolyte membrane 11 is twisted, the cathode 12 is removed from the unit cell 20 as shown in FIG. 7(d). The remaining unit cell including only the electrolyte membrane 11 and the anode 13 is then turned up to face the anode 13 down as shown in FIG. 7(e). The four corners of the electrolyte membrane 11 are again turned up as shown in FIGS. 7(f) and 7(g). While the electrolyte membrane 11 is twisted, the anode 13 is removed from the electrolyte membrane 11 as shown in FIG. 7(h). In the step of FIG. 7(d) or 7(h), the cathode 12 or the anode 13 disposed on the lower side is easily separated from the electrolyte membrane 11 by its own weight only by twisting the electrolyte membrane 11. This process divides each unit cell 20 into the three constituents; the electrolyte membrane 11, the cathode 12, and the anode 13.

Although the cathode 12 and the anode 13 are removed from the electrolyte membrane 11 in this order in the above example, the anode 13 may be removed prior to the cathode 12.

Figure 8A:
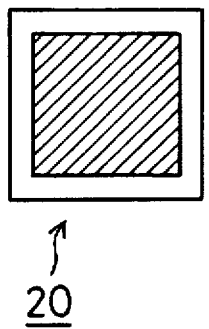
FIG. 8 schematically illustrates a shifting operation applicable to the separating process.
Figure 8B:
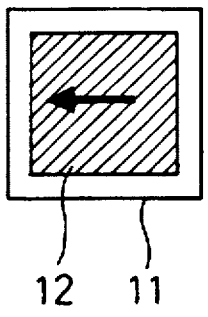
Figure 8C:
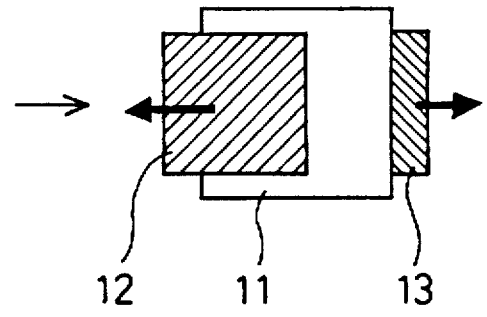

FIG. 8 schematically illustrates a shifting operation applicable to the separating process. After the soaking process, the electrodes of each unit cell 20 shown in FIG. 8(a), that is, the cathode 12 and the anode 13, are independently clamped. While the cathode 12 and the anode 13 are securely clamped, the cathode 12 and the anode 13 are slowly shifted in the opposite directions (left and right) as shown in FIGS. 8(b) and 8(c). This process also divides each unit cell 20 into the three constituents; the electrolyte membrane 11, the cathode 12, and the anode 13.

Figure 9A:
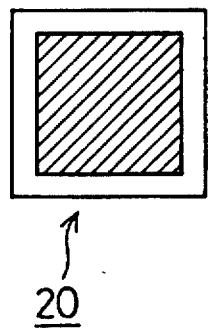
FIG. 9 schematically illustrates a rotating operation applicable to the separating process.
Figure 9B:
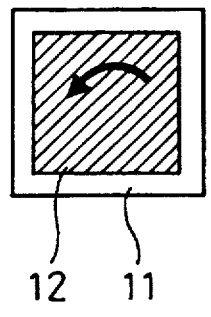
Figure 9C:
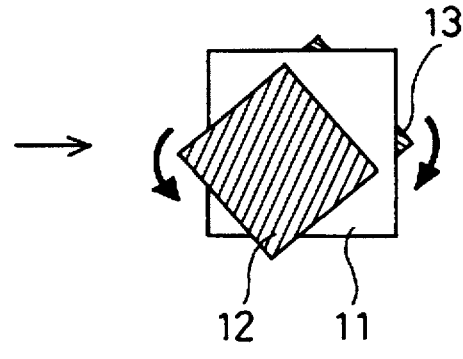

FIG. 9 schematically illustrates a rotating operation applicable to the separating process. After the soaking process, the electrodes of each unit cell 20 shown in FIG. 9(a), that is, the cathode 12 and the anode 13, are independently clamped. While the cathode 12 and the anode 13 are securely clamped, the cathode 12 and the anode 13 are slowly rotated in the opposite directions (counterclockwise and clockwise) as shown in FIGS. 9(b) and 9(c). This process also divides each unit cell 20 into the three constituents; the electrolyte membrane 11, the cathode 12, and the anode 13.

The peel-off operation, the twisting operation, the shifting operation, or the rotating operation is applied to the separating process as described above. Since flexible carbon cloth is used as base material of the cathode 12 and the anode 13 in the first embodiment, any of the peel-off operation, the twisting operation, the shifting operation, and the rotating operation is applicable to the separating process. The flexibility of carbon cloth protects the cathode 12 and the anode 13 from being cracked in the peel-off or twisting operation. When a rigid substance like carbon paper is used as base material of the cathode 12 and the anode 13, on the other hand, the peel-off operation or the twisting operation is not suitable, but either the shifting operation or the rotating operation is preferably applied to the separating process. The rigidity of carbon paper may lead to cracks of the carbon paper in the peel-off or twisting operation.

Figure 10:
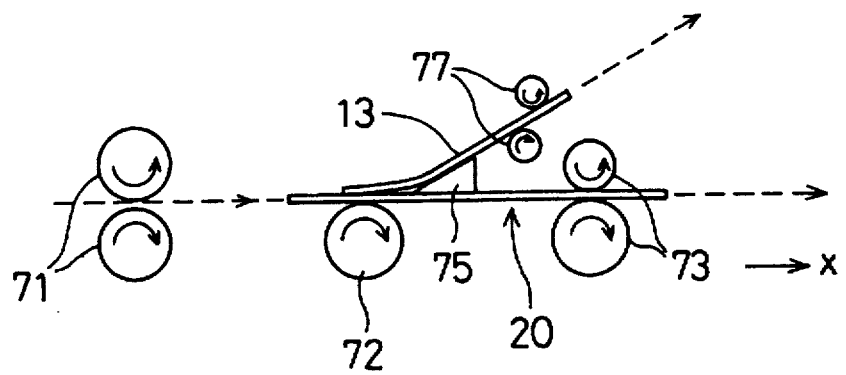
FIG. 10 is a front view schematically illustrating an apparatus applied to the separating process by the peel-off operation shown in FIG. 6.
Figure 11:
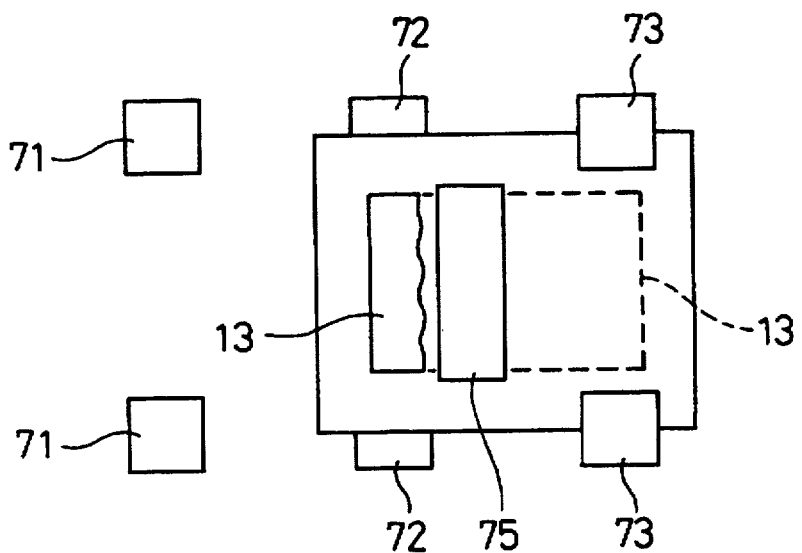
FIG. 11 is a plan view showing the apparatus of FIG. 10.

FIG. 10 is a front view schematically illustrating an apparatus applied to the separating process by the peel-off operation shown in FIG. 6, and FIG. 11 is a plan view showing the apparatus of FIG. 10. The apparatus includes three sets of feed rollers 71, 72, and 73 to feed each unit cell 20 in a predetermined direction (x direction in the drawing), a squeegee 75 disposed along the feeding path of the unit cell 20 for peeling one electrode (for example, the anode 13) off the unit cell 20 fed via the feed rollers 71 and 72, and a set of feed-off rollers 77 for feeding the peeled electrode in a predetermined direction, which is different from the feeding direction of the unit cell 20. The three sets of feed rollers 71, 72, and 73 clamp and support the electrolyte membrane 11 of the unit cell 20. Since the anode 13 bonded to the electrolyte membrane 11 is smaller in size than the electrolyte membrane 11 as shown in FIG. 11, these feed rollers 71 through 73 do not clamp the anode 13.

The unit cell 20 fed via the feed rollers 71, 72, and 73 comes into contact with the squeegee 75. The unit cell 20, which is sufficiently expanded and deformed in the preceding soaking process, is in contact with the squeegee 75 at the interface between the electrolyte membrane 11 and the anode 13. The squeegee 75 thus peels the anode 13 off the electrolyte membrane 11 as the unit cell 20 is fed along the predetermined path. This allows the electrolyte membrane 11 to be easily separated from the unit cell 20.

Figure 12:
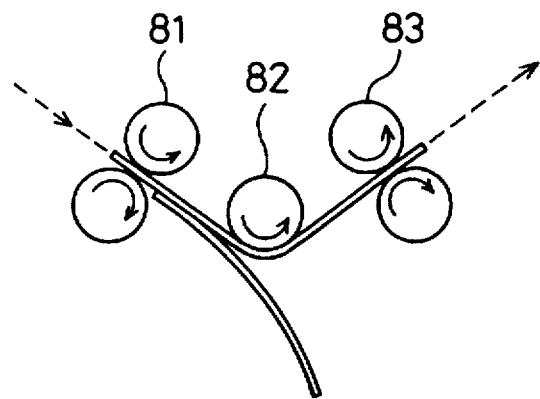
FIG. 12 schematically shows another apparatus applied to the separating process by the twisting operation.

FIG. 12 schematically shows another apparatus applied to the separating process by the twisting operation. The apparatus includes three sets of feed rollers 81, 82, and 83, which change the feeding direction of each unit cell 20 from the oblique downward to the oblique upward. This structure allows only the electrolyte membrane 11 in the unit cell 20 to change the course from the oblique downward to the oblique upward, whereas the anode 13 is peeled down. This apparatus easily separates the electrolyte membrane 11 from the unit cell 20 only by changing the feeding direction of the unit cell 20.

Another modification of the first embodiment is explained briefly. Although the electrolyte membrane 11 is bonded to the cathode 12 and the anode 13 via the proton-conductive polymer electrolyte solution in the first embodiment, one of the three methods (1) through (3) given below may be applied to the bonding process:

(1) Carbon powder with platinum catalyst or platinum-containing alloy catalyst supported thereon is applied onto the surface of carbon cloth used as base material of electrodes. The electrolyte membrane and the electrode bases are then integrated by hot pressing.

(2) Carbon powder with platinum catalyst or platinum-containing alloy catalyst supported thereon is dispersed in an appropriate organic solvent to yield paste. The paste is applied on the surface of the electrolyte membrane by a known technique, like screen printing. The electrolyte membrane and electrode bases are subsequently integrated by hot pressing.

(3) Platinum is supported on the surface of the electrolyte membrane by sputtering, vapor deposition, CVD, PVD, or another method of thin film formation. The electrolyte membrane and electrode bases are subsequently integrated by hot pressing.

When electrolyte membranes are recovered from the unit cells prepared according to the above method (1), it is preferable that a solution having distinct ability of dissolving the cured proton-conductive polymer electrolyte is used in the soaking process. When electrolyte membranes are recovered from the unit cells prepared according to either the method (2) or (3), on the other hand, it is preferable that a solution having distinct ability of expanding the electrolyte membranes 11 is used in the soaking process. In either case, methanol is preferably used to satisfy both the required abilities.

Figure 13:
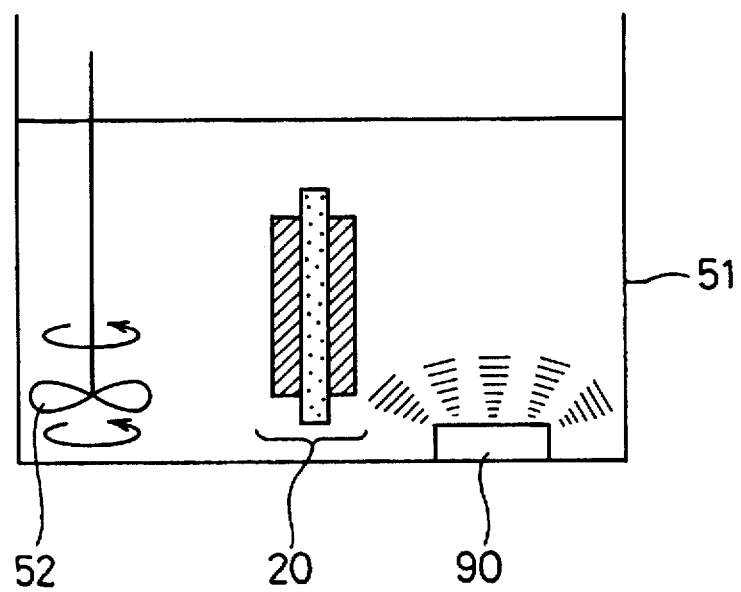
FIG. 13 shows a soaking tank used for realizing the soaking process in a second embodiment according to the present invention.

Another method of recovering electrolyte membranes from unit cells is described as a second embodiment according to the present invention. The method of the second embodiment is similar to that of the first embodiment, except the soaking process. In the soaking process of the second embodiment, each unit cell 20 is soaked in a soaking tank 51 with a vibrator 90 as well as the stirrer 52 as shown in FIG. 13. The vibrator 90 is an ultrasonic vibrator used for vibrating methanol in the soaking tank 51.

In the first embodiment, each unit cell 20 is soaked in methanol having abilities of expanding and deforming the electrolyte membrane 11 of the unit cell 20 and dissolving the cured proton-conductive polymer electrolyte used as an adhesive of the unit cell 20. This soaking process effectively weakens the adhesive forces of joining the electrolyte membrane 11 with the cathode 12 and the anode 13. In order to exert this effect efficiently, it is required to lead methanol quickly into the spaces between the electrolyte membrane 11 and the cathode 12 and between the electrolyte membrane 11 and the anode 13.

In the structure of the second embodiment, the vibrator 90 vibrates methanol, in which the unit cell 20 is soaked, thereby allowing the spaces between the electrolyte membrane 11 and the electrodes 12 and 13 of the unit cell 20 to be filled with methanol in a short time period. This shortens the time period required for weakening the adhesive forces of joining the electrolyte membrane 11 with the cathode 12 and the anode 13 and realizes the easier separation of the electrolyte membrane 11 in the subsequent separating process.

The soaking time required for separating the electrolyte membrane 11 in the second embodiment was compared with the same in the first embodiment. The results of comparison show that ultrasonic vibration shortens the required soaking time to almost the half and that the greater area of the electrodes of the unit cell 20 enhances the effect of shortening the required soaking time by ultrasonic vibration.

Ultrasonic vibration naturally accelerates the vaporization of methanol. In the structure of the second embodiment, it is thus preferred that the open-top of the soaking tank 51 is covered with a lid to interfere with disperse of methanol vapor or that a cooling tube is arranged above the soaking tank 51 to make methanol vapor condensed and returned into the soaking tank 51. High-output ultrasonic vibration is required in general, when only a little quantity of methanol is used for processing a mass of cell units 20.

Although the vibrator 90 is placed in the soaking tank 51 in the second embodiment, the vibrator 90 may alternatively be disposed in the separation tank 53. Like the soaking tank 51, the separation tank 53 is filled with methanol. The vibrator 90 placed in the separation tank 53 vibrates methanol in the separation tank 53 and thereby allows the spaces between the electrolyte membrane 11 and the electrodes 12 and 13 to be filled with methanol in a short time period. This also shortens the time period required for weakening the adhesive forces of joining the electrolyte membrane 11 with the cathode 12 and the anode 13 and realizes the easier separation of the electrolyte membrane 11 in the subsequent separating process.

In the second embodiment, the vibrator 90 works to vibrate methanol, in which the unit cell 20 is soaked. An alternative structure may directly vibrate the unit cell 20.

Still another method of recovering electrolyte membranes from unit cells is described as a third embodiment according to the present invention. The method of the third embodiment is similar to that of the first embodiment, except that a plurality of soaking tanks are used in the soaking process.

Figure 14:
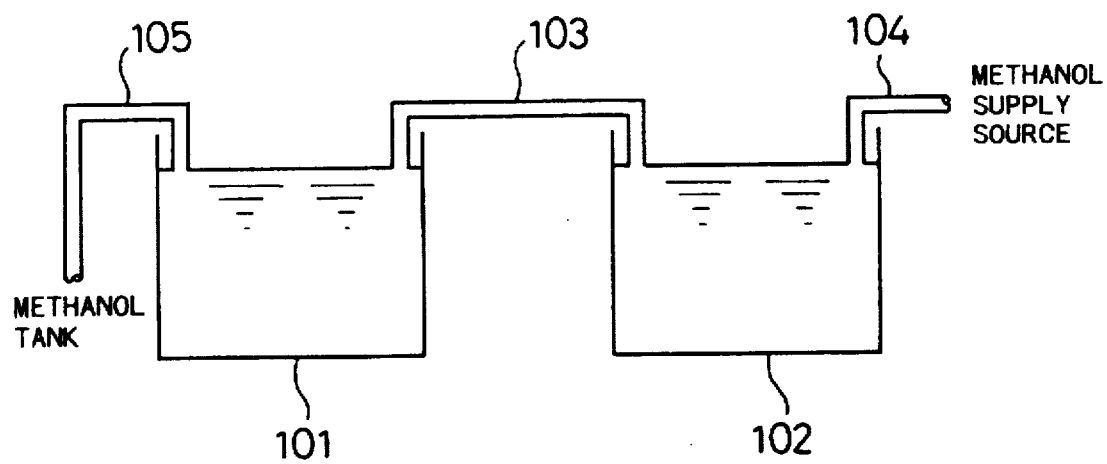
FIG. 14 shows a structure of realizing the soaking process in a third embodiment according to the present invention.

FIG. 14 shows a structure of realizing the soaking process in the third embodiment. A first soaking tank 101 and a second soaking tank 102 used in the soaking process are connected with each other via a connection pipe 103. The second soaking tank 102 is further connected to a methanol supply source via a pipe 104, while the first soaking tank 101 is connected to a methanol tank via a pipe 105. A supply of methanol from the methanol supply source is first fed to the second soaking tank 102 via the pipe 104. Methanol overflowing the second soaking tank 102 is then fed to the first soaking tank 101 via the connection pipe 103. Methanol overflowing the first soaking tank 101 is finally led to the methanol tank via the pipe 105.

The unit cell 20 consisting of the electrolyte membrane 11, the cathode 12, and the anode 13 is soaked first in the first soaking tank 101 and then in the second soaking tank 102 and subsequently conveyed to a separation tank (not shown).

In the third embodiment thus constructed, water included in the electrolyte membrane 11 of the unit cell 20 is substituted by methanol in the first soaking tank 101. The substitution of water by methanol lowers the concentration of methanol in the first soaking tank 101. Since most water included in the electrolyte membrane 11 has been substituted by methanol in the first soaking tank 101, the unit cell 20 soaked in the second soaking tank 102 hardly causes contamination with water in the second soaking tank 102. As long as an adequate supply of methanol is fed to the second soaking tank 102, the structure of the third embodiment keeps the concentration of methanol in the second soaking tank 102 substantially constant, irrespective of the processed quantity of unit cells 20.

In the first embodiment with only one soaking tank 51 in the soaking process, the greater quantity of unit cells 20 undesirably lowers the concentration of methanol in the soaking tank 51. The higher concentration of methanol is preferable for easy separation of the electrolyte membrane 11 in the separating process. In the structure of the first embodiment, replacement of methanol in the soaking tank 51 is thus required whenever a predetermined quantity of unit cells 20 have been processed. In the structure of the third embodiment, on the other hand, the concentration of methanol in the second soaking tank 102 is kept substantially constant, irrespective of the processed quantity of unit cells 20. This structure does not require the time- and labor-consuming replacement of methanol in the soaking tank and saves the time and labor for maintenance. The structure of the third embodiment further ensures easy separation of the electrolyte membrane 11 in the subsequent separating process.

Although the two soaking tanks 101 and 102 are used in the soaking process in the third embodiment, three of more soaking tanks may be used instead. The required structure herein is that a plurality of soaking tanks are used in the soaking process, that a supply of methanol is first fed to a last tank among the plurality of tanks along the feeding path of the unit cells 20, and that methanol overflowing the last tank is fed to preceding tanks successively. This structure allows the concentration of methanol to be kept substantially constant in the last tank among the plurality of tanks.

Another method of recovering electrolyte membranes from unit cells is described as a fourth embodiment according to the present invention. The method of the fourth embodiment is similar to that of the first embodiment, except that a plurality of substitution tanks are used in the substituting process.

Figure 15:
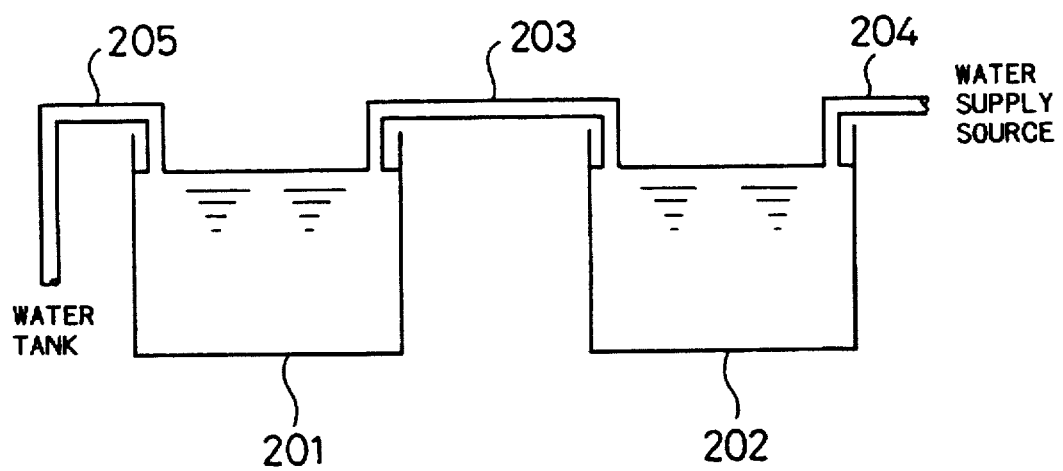
FIG. 15 shows a structure of realizing the substituting process in a fourth embodiment according to the present invention.

FIG. 15 shows a structure of realizing the substituting process in the fourth embodiment. A first substitution tank 201 and a second substitution tank 202 used in the substituting process are connected with each other via a connection pipe 203. The second substitution tank 202 is further connected to a water supply source via a pipe 204, while the first substitution tank 201 is connected to a water tank via a pipe 205. A supply of deionized water from the water supply source is first fed to the second substitution tank 202 via the pipe 204. Deionized water overflowing the second substitution tank 202 is then fed to the first substitution tank 201 via the connection pipe 203. Deionized water overflowing the first substitution tank 201 is finally led to the water tank via the pipe 205.

The unit cell 20 consisting of the electrolyte membrane 11, the cathode 12, and the anode 13 is fed from the first substitution tank 201 to the second substitution tank 202 and subsequently conveyed to a wash tank (not shown).

In the fourth embodiment thus constructed, methanol included in the electrolyte membrane 11 of the unit cell 20 (in the soaking process and the separating process) is substituted by deionized water in the first substitution tank 201. The substitution of methanol by deionized water lowers the concentration of deionized water in the first substitution tank 201. Namely deionized water in the first substitution tank 201 is contaminated with methanol. Since most methanol included in the electrolyte membrane 11 has been substituted by deionized water in the first substitution tank 201, the unit cell 20 placed in the second substitution tank 202 hardly causes contamination with methanol in the second substitution tank 202. As long as an adequate supply of deionized water is fed to the second substitution tank 202, the structure of the fourth embodiment protects deionized water in the second substitution tank 202 from contamination with methanol, irrespective of the processed quantity of unit cells 20.

In the first embodiment with only one substitution tank 55 in the substituting process, the greater quantity of unit cells 20 undesirably increases the degree of contamination of deionized water in the substitution tank 55 with methanol. The higher concentration of deionized water is preferable for effective wash of the electrolyte membrane 11 in the subsequent washing process. In the structure of the first embodiment, replacement of deionized water in the substitution tank 55 is thus required whenever a predetermined quantity of unit cells 20 have been processed. In the structure of the fourth embodiment, on the other hand, deionized water in the second substitution tank 202 is substantially free from contamination with methanol, irrespective of the processed quantity of unit cells 20. This structure does not require the time- and labor-consuming replacement of deionized water in the substitution tank and saves the time and labor for maintenance. The structure of the fourth embodiment further ensures effective wash of the electrolyte membrane 11 in the subsequent washing process.

Although the two substitution tanks 201 and 202 are used in the substituting process in the fourth embodiment, three of more substitution tanks may be used instead. The required structure herein is that a plurality of substitution tanks are used in the substituting process, that a supply of deionized water is first fed to a last tank among the plurality of tanks along the feeding path of the unit cells 20, and that deionized water overflowing the last tank is fed to preceding tanks successively. This structure protects deionized water in the last tank from contamination with methanol.

Although the third embodiment and the fourth embodiment respectively use a plurality of soaking tanks and a plurality of substitution tanks, another possible structure may involve both a plurality of soaking tanks and a plurality of substitution tanks.

Figure 16:
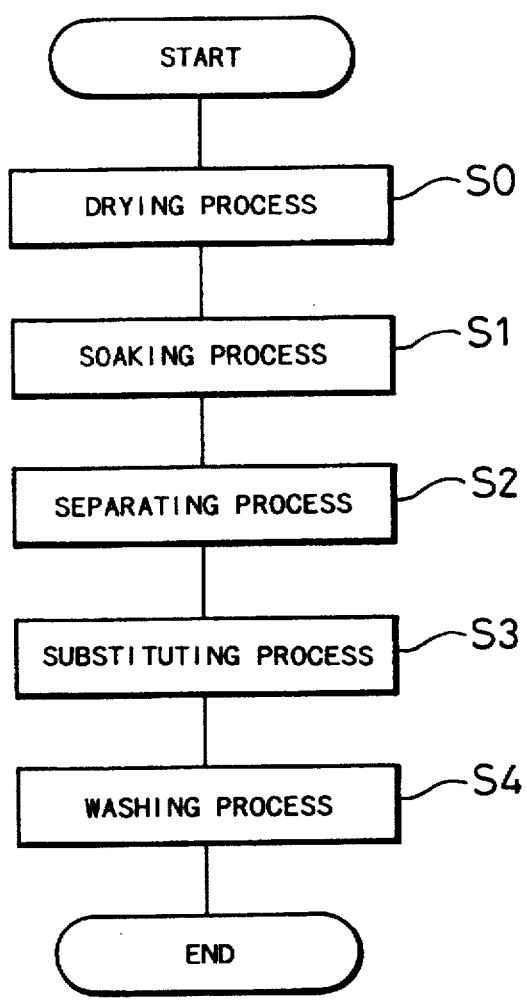
FIG. 16 is a flowchart showing a process routine of recovering electrolyte membranes from fuel cells in a fifth embodiment according to the present invention.

Another method of recovering electrolyte membranes from unit cells is described as a fifth embodiment according to the present invention. The method of the fifth embodiment is similar to that of the first embodiment, except a drying process (step S0) for drying the unit cells 20 prior to the soaking process of step S1 as shown in the flowchart of FIG. 16.

In the drying process executed prior to the soaking process, the unit cells 20 are transported to a dry chamber and heated at 80° C. for approximately one hour. This process completely removes the water content included in each unit cell 20. The pre-dried unit cells 20 then undergo the soaking process as described in the first embodiment.

The method of the fifth embodiment dries the unit cells 20 prior to the soaking process, thereby increasing the expansion ratio of the electrolyte membrane 11 soaked in methanol in the soaking process. In the structure of the first embodiment, the abilities of methanol of expanding and deforming the electrolyte membrane 11 and dissolving the cured proton-conductive polymer electrolyte working as an adhesive for bonding the electrolyte membrane 11 to the electrodes 12 and 13 are utilized to weaken the adhesive forces of joining the electrolyte membrane 11 with the electrodes 12 and 13. The structure of the fifth embodiment, on the other hand, increases the expansion ratio and thereby the deformation degree of the electrolyte membrane 11, thus further weakening the adhesive forces of joining the electrolyte membrane 11 with the electrodes 12 and 13. This ensures easy separation of the electrolyte membrane 11 from the electrodes 12 and 13 in the subsequent separating process.

In the fifth embodiment, the water content included in the electrolyte membrane 11 is removed in the drying process prior to the soaking process. The previous removal of the water content makes methanol in the soaking tank free from contamination with water included in the electrolyte membrane 11 in the soaking processes, thus not lowering the concentration of methanol in the soaking tank. This reduces the frequency of replacement of methanol in the soaking process.

Heating under reduced pressure allows the unit cells 20 to be dried at lower temperatures in a shorter time period. Although high temperatures complete the drying process in a shorter time period, the electrolyte membranes 11 may be deteriorated by the high temperatures. It is accordingly preferable that the unit cells are dried at approximately 80° C., which is the temperature of standard operation of polymer electrolyte fuel cells.

Figure 17:
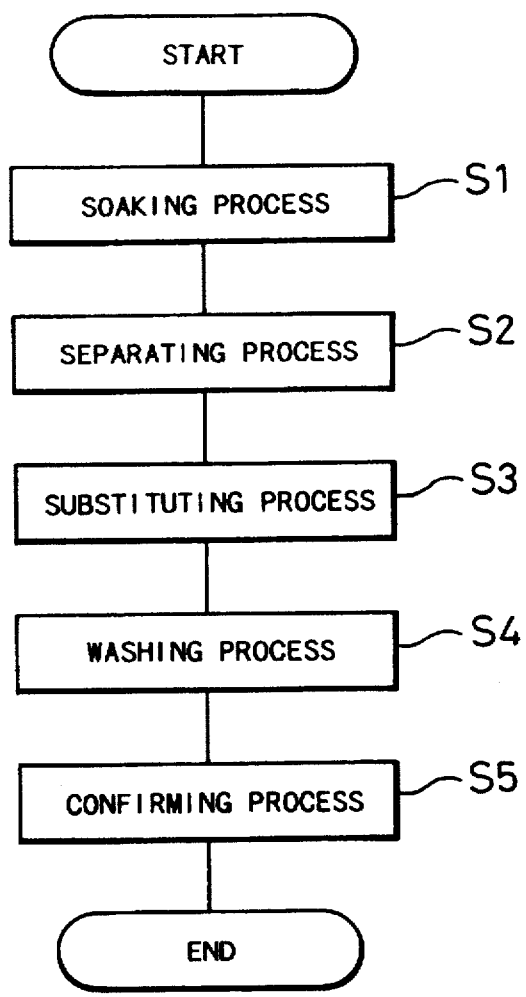
FIG. 17 is a flowchart showing a process routine of recovering electrolyte membranes from fuel cells in a sixth embodiment according to the present invention.

Another method of recovering electrolyte membranes from unit cells is described as a sixth embodiment according to the present invention. The method of the sixth embodiment is similar to that of the first embodiment, except a confirming process (step S5) executed after the washing process of step S4 as shown in the flowchart of FIG. 17. At step S5, it is determined whether the substitution of methanol in the electrolyte membranes 11 by deionized water in the substituting process of step S3 and the wash of the electrolyte membranes 11 in the washing process of step S4 have been completed.

In the confirming process, each electrolyte membrane 11 is irradiated with a light beam of specified wavelengths. It is determined whether the substitution in the substituting process and the wash in the washing process have been completed, based on existence or non-existence of an absorption peak at the specified wavelengths. According to a concrete procedure shown in FIG. 18, a light beam emitted from a light source 301 is introduced into a spectroscope 303, which extracts infrared radiation of specified wavelengths of 1050 to 1085 $cm^{-1}$. The electrolyte membrane 11 is irradiated with the infrared radiation, and a spectrophotometer 305 measures the intensity of transmitted light. A control unit 307, which is constructed as a microcomputer including a CPU, a ROM, and a RAM, receives the results of measurement and determines the completion of the substituting and washing processes.

Figure 19:
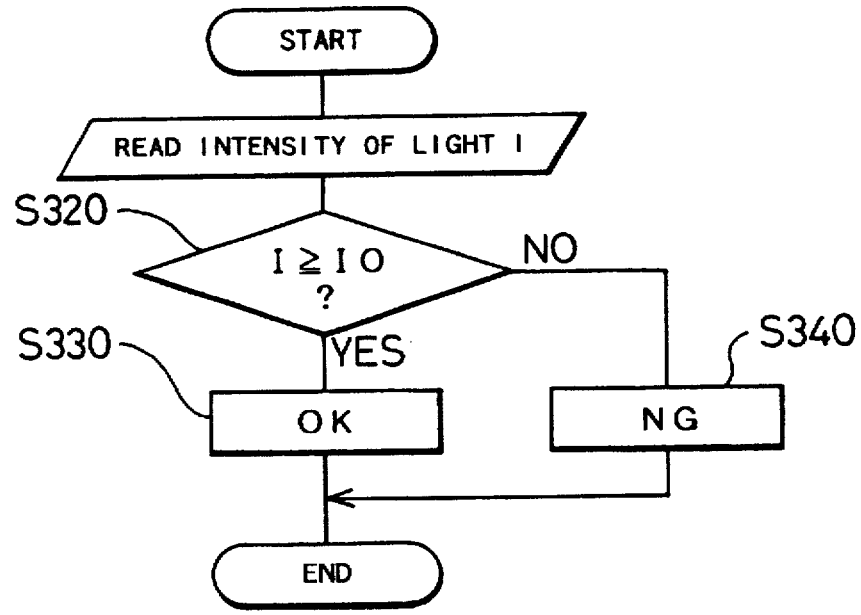
FIG. 19 is a flowchart showing a routine executed by a control unit of the apparatus shown in FIG. 18.

FIG. 19 is a flowchart showing a control routine executed by the control unit 307. When the program enters the routine, the CPU of the control unit 307 first reads the spectrophotometer 305 to input an intensity of transmitted light I at step S310. At subsequent step S320, the measured intensity of transmitted light I is compared with a predetermined intensity I0. The predetermined intensity I0 is obtained as the intensity of light transmitted by a standard sample, which is an electrolyte membrane 11 containing substantially no methanol, that is, under the condition that methanol included in the electrolyte membrane 11 has almost completely been substituted by water in the substituting process.

Methanol absorbs infrared radiation of specified wavelengths of 1050 to 1085 $cm^{-1}$, absorb the infrared radiation of the specified wavelengths. The value measured by the spectrophotometer 305 thus decreases due to the large absorption with an increase in concentration of methanol included in the electrolyte membrane 11. When the measured intensity of transmitted light I is no less than the predetermined intensity I0 obtained under the non-methanol existing condition at step S320, the CPU of the control unit 307 determines that the electrolyte membrane 11 contains no methanol and the program proceeds to step S330.

At step S330, the CPU of the control unit 307 receives the 'OK' sign, that is, confirms that the substitution in the substituting process and the wash in the washing process have been completed. When the measured intensity of transmitted light I is less than the predetermined intensity I0 at step S320, the program proceeds to step S340, at which the CPU of the control unit 307 receives the 'NG' sign, that is, determines that the substitution in the substituting process and the wash in the washing process have not been completed. After the execution of either step S330 or S340, the program goes to END and exits from the routine.

When the CPU determines that the substitution in the substituting process and the wash in the washing process have not been completed at step S340, the electrolyte membrane 11 is returned to the substitution tank for further substitution of methanol by water. It is preferred that the rotating speed of the stirrer in the substitution tank is increased to realize the vigorous stirring of deionized water or that the supply of deionized water fed to the substitution tank is increased.

The method of the sixth embodiment thus constructed determines whether the substitution in the substituting process and the wash in the washing process have been completed, thereby ensuring the complete substitution and wash. The electrolyte membranes 11 recovered from the unit cells 20 of the used polymer electrolyte fuel cells 10 by the method of the sixth embodiment can be recycled without any troubles or problems.

Figure 18:
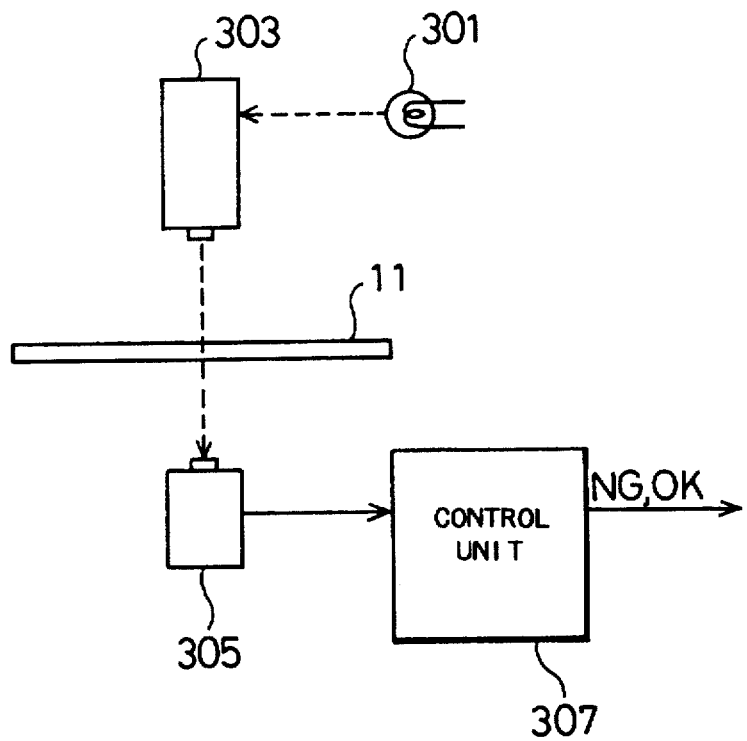
FIG. 18 schematically illustrates an apparatus for realizing the confirming process of the process routine in the sixth embodiment.

The structure shown in FIG. 18 except the control unit 307 may be arranged in the wash tank or along the feeding path of the washed electrolyte membranes 11 by means of feed rollers.

Figure 20:
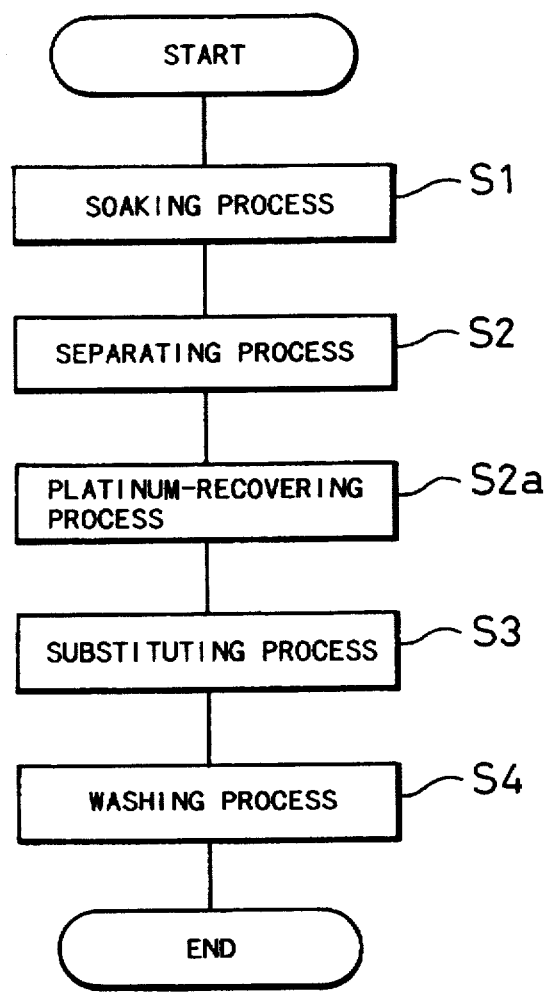
FIG. 20 is a flowchart showing a process routine of recovering electrolyte membranes from fuel cells in a seventh embodiment according to the present invention.

Still another method of recovering electrolyte membranes from unit cells is described as a seventh embodiment according to the present invention. The method of the seventh embodiment is similar to that of the first embodiment, except a platinum-recovering process (step S2a) executed after the separating process of step S2 as shown in the flowchart of FIG. 20.

Figure 21:
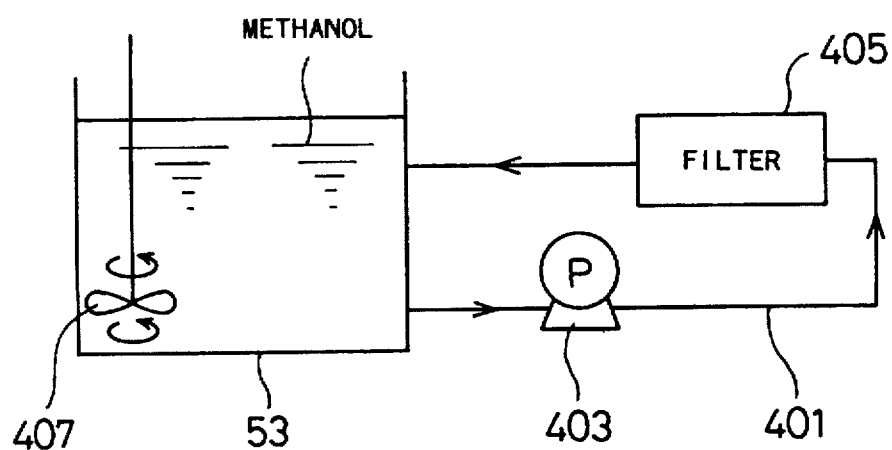
FIG. 21 schematically illustrates an apparatus for realizing the platinum-recovering process of the process routine in the seventh embodiment.

In the platinum-recovering process, carbon powder with platinum catalyst supported thereon is recovered from methanol in a separation tank. According to a concrete procedure shown in FIG. 21, a circulating path 401 is arranged outside a separation tank 53 to make methanol flowing out of the separation tank 53 returned to the separation tank 53. The circulating path 401 is provided with a pump 403 and a filter 405. The pump 403 works to make methanol in the separation tank 53 flow through the circulating path 401, while the filter 405 collects the carbon powder suspended in methanol in the separation tank 53.

Carbon powder with platinum catalyst supported thereon is suspended in methanol in the separation tank 53 because of the reason below. In the soaking process and the subsequent separating process, the cured proton-conductive polymer electrolyte used as an adhesive of bonding the electrolyte membrane 11 to the electrodes 12 and 13 is dissolved by the ability of methanol, in which each unit cell 20 is soaked. The proton-conductive polymer electrolyte solution is also used for applying carbon powder with platinum catalyst onto the electrodes. Methanol naturally dissolves the cured proton-conductive polymer electrolyte used for application of the carbon powder as well as that used for bonding the electrolyte membrane 11. The carbon powder with platinum catalyst supported thereon is thus separated from the electrodes and suspended in methanol. The suspended carbon powder is collected by the filter 405 as described previously.

The platinum catalyst-containing carbon powder collected by the filter 405 is recycled, like the electrolyte membranes 11. The recycled platinum in combination with the recycled electrolyte membranes 11, which is characteristic of the present invention, further reduces the cost of manufacturing the polymer electrolyte fuel cells 10.

Although the platinum-recovering process is executed immediately after the separating process in the seventh embodiment, the recovery of platinum may be carried out immediately after the soaking process. The unit cells 20 are sufficiently soaked in methanol in the soaking process, which allows a considerable amount of carbon powder with platinum catalyst supported thereon to be suspended in methanol. The platinum-recovering process executed after the soaking process but before the separating process also yields a considerable amount of recovered platinum.

The vibrator 90 used in the second embodiment may be incorporated in the separation tank 53 of the seventh embodiment. Ultrasonic vibration of the vibrator 90 allows carbon powder applied to the surface of the electrodes of the unit cell 20 to be easily separated from the electrodes.

In the first through the seventh embodiments described above, the stack of polymer electrolyte fuel cells 10 is previously decomposed into unit cells 20 and the electrolyte membrane 11 is recovered from each unit cell 20. Another method given as an eighth embodiment according to the present invention implements part of the process of recovering the electrolyte membranes 11 without decomposing the stack of polymer electrolyte fuel cells 10.

Figure 22:
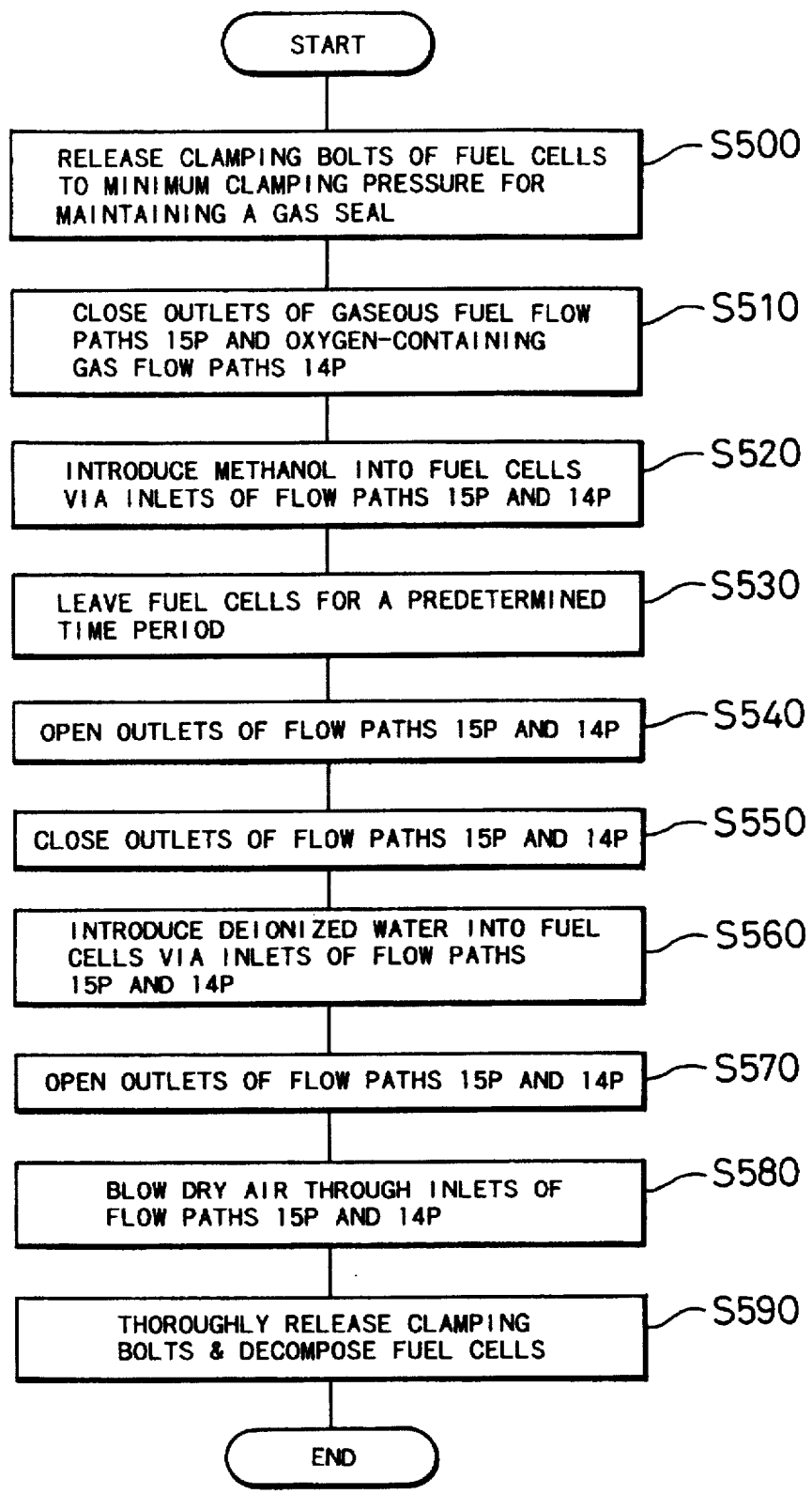
FIG. 22 is a flowchart showing a process routine of recovering electrolyte membranes from fuel cells in an eighth embodiment according to the present invention.

FIG. 22 is a flowchart showing a process routine of recovering electrolyte membranes from fuel cells in the eighth embodiment. When the program enters the routine, the clamping bolts 28 (see FIG. 3) in the stack of polymer electrolyte fuel cells 10 are released to a minimum clamping pressure for maintaining a gas seal at step S500. In general, the practical clamping pressure of the clamping bolts 28 is determined to give a minimum cell resistance (resistance between terminals) to the stack of polymer electrolyte fuel cells 10. In many cases, the practical clamping pressure is sufficiently larger than the minimum clamping pressure for maintaining a gas seal. At step S500, the clamping pressure of the clamping bolts 28 is reduced from the sufficiently large value giving the minimum cell resistance to the minimum value maintaining a gas seal.

The program then proceeds to step S510, at which an outlet of the gaseous fuel flow paths 15P (see FIG. 3) and that of the oxygen-containing gas flow paths 14P (see FIG. 3) are closed in the stack of polymer electrolyte fuel cells 10. According to a concrete procedure, on-off valves disposed at both the outlets are closed.

Methanol is introduced into the stack of polymer electrolyte fuel cells 10 via an inlet of the gaseous fuel flow paths 15P and that of the oxygen-containing gas flow paths 14P at step S520. The stack of polymer electrolyte fuel cells 10 filled with methanol is left under this condition for a predetermined time period at step S530. This realizes the soaking process in the stack of polymer electrolyte fuel cells 10. In order to prevent the air from remaining in the stack of polymer electrolyte fuel cells 10 in the process of introducing methanol at step S520, one applicable method introduces methanol in limited amounts through the inlets of the gaseous fuel flow paths 15P and the oxygen-containing gas flow paths 14P before closing the outlets of the gaseous fuel flow paths 15P and the oxygen-containing gas flow paths 14P at step S510. The method closes the outlets of the gaseous fuel flow paths 15P and the oxygen-containing gas flow paths 14P after a certain time period, when it is expected that the remaining gas has completely been released from the gaseous fuel flow paths 15P and the oxygen-containing gas flow paths 14P.

Another method of preventing the air from remaining in the stack of polymer electrolyte fuel cells 10 connects the inlet and the outlet of the gaseous fuel flow paths 15P with each other via a tube and those of the oxygen-containing gas flow paths 14P with each other via another tube. Methanol is then circulated through a circulating path formed by these tubes. Still another method connects the outlet of the gaseous fuel flow paths 15P with the inlet of the oxygen-containing gas flow paths 14P via a tube and the outlet of the oxygen-containing gas flow paths 14P with the inlet of the gaseous fuel flow paths 15P via another tube. In this method, methanol is also circulated through a circulating path formed by these tubes.

After the predetermined time period has elapsed, the program proceeds to step S540, at which the outlets of the gaseous fuel flow paths 15P and the oxygen-containing gas flow paths 14P are opened. According to a concrete procedure, the on-off valves disposed at both the outlets are opened. This allows methanol introduced into the stack of polymer electrolyte fuel cells 10 to be discharged through both the outlets. In one preferred structure, the air is blown through the inlets of the gaseous fuel flow paths 15P and the oxygen-containing gas flow paths 14P in order to forcibly discharge methanol remaining in the stack of polymer electrolyte fuel cells 10.

At step S550, the outlets of the gaseous fuel flow paths 15P and the oxygen-containing gas flow paths 14P are closed again in the same manner as step S510. The program then proceeds to step S560, at which deionized water is introduced into the stack of polymer electrolyte fuel cells via the inlets of the gaseous fuel flow paths 15P and the oxygen-containing gas flow paths 14P. As in the case of introducing methanol, one applicable method introduces deionized water in limited amounts through the inlets of the gaseous fuel flow paths 15P and the oxygen-containing gas flow paths 14P before closing the outlets of the gaseous fuel flow paths 15P and the oxygen-containing gas flow paths 14P. This method closes the outlets of the gaseous fuel flow paths 15P and the oxygen-containing gas flow paths 14P after a certain time period, when it is expected that the remaining methanol has completely been discharged from the gaseous fuel flow paths 15P and the oxygen-containing gas flow paths 14P.

At step S570, the outlets of the gaseous fuel flow paths 15P and the oxygen-containing gas flow paths 14P are opened again in the same manner as step S540. This allows deionized water introduced into the stack of polymer electrolyte fuel cells 10 to be discharged through both the outlets.

The program then proceeds to step S580, at which dried air is flown into the stack of polymer electrolyte fuel cells 10 through the inlets of the gaseous fuel flow paths 15P and the oxygen-containing gas flow paths 14P, in order to dry the inside of the stack of polymer electrolyte fuel cells 10. At subsequent step S590, the clamping bolts 28 in the stack of polymer electrolyte fuel cells 10 are thoroughly released and the stack of polymer electrolyte fuel cells 10 is decomposed. The electrolyte membranes 11 are recovered from the decomposed stack of polymer electrolyte fuel cells 10.

In order to reduce the cell resistance as well as the contact resistance between the separator 14 and the cathode 12 or the separator 15 and the anode 13, a sufficiently large clamping force is applied to the stack of polymer electrolyte fuel cells 10 in the process of assembly. The sufficiently large clamping force is generally greater than the minimum clamping pressure for maintaining a gas seal. This often causes the cathode 12 and the anode 13 to be pressed against and adhere to the separators 14 and 15. There is a possibility of damaging the electrolyte membranes 11 of the lowest strength in the process of decomposing the stack of polymer electrolyte fuel cells 10.

The method of the eighth embodiment first releases the clamping bolts 28 to the minimum clamping pressure for maintaining a gas seal in the stack of polymer electrolyte fuel cells 10. Methanol is then introduced into the stack of polymer electrolyte fuel cells 10 to realize the soaking process without decomposing the stack of polymer electrolyte fuel cells 10 into the unit cells 20. After the soaking process is completed, the clamping bolts 28 are thoroughly released and the stack of polymer electrolyte fuel cells 10 are decomposed into the unit cells 20. Methanol works to make the electrolyte membranes 11 easily separable from the electrodes 12 and 13 in the decomposed stack of polymer electrolyte fuel cells 10. This effectively protects the electrolyte membranes 11 from being damaged by the decomposing process. In the method of the eighth embodiment, the clamping pressure is reduced to the minimum value for maintaining a gas seal prior to the injection of methanol into the stack of polymer electrolyte fuel cells 10. The decrease in clamping pressure of the clamping bolts 28 helps the action of methanol to weaken the adhesive forces of joining the electrolyte membrane 11 with the electrodes 12 and 13. The reduced level of the clamping pressure is determined to prevent leakage of methanol.

As described above, the method of the eighth embodiment implements the soaking process without decomposing the stack of polymer electrolyte fuel cells 10, thus protecting the electrolyte membranes 11 from damages and allowing the electrolyte membranes 11 of preferable condition to be easily recovered.

Although methanol is introduced into the stack of polymer electrolyte fuel cells 10 at step S520 in the flowchart of FIG. 22, another solution may be used instead. As described previously, methanol has both the required abilities of expanding the electrolyte membrane 11 and dissolving the cured proton-conductive polymer electrolyte. However, solutions having distinct ability of expanding the electrolyte membranes 11 but no ability of the latter may be used at step S520. Such solutions also realize the soaking process without decomposing the stack of polymer electrolyte fuel cells 10 into the unit cells 20, so as to allow efficient recovery of the electrolyte membranes 11.

The above embodiments are only illustrative and not restrictive in any sense. There may be many other modifications, alterations, and changes without departing from the scope or spirit of essential characteristics of the invention. The scope and spirit of the present invention are limited only by the terms of the appended claims.

What is claimed is:

1. A method of recovering an electrolyte membrane from a fuel cell, said method comprising:
   (a) providing said electrolyte membrane and an electrode which are bonded with each other,
   (b) soaking said electrolyte membrane and electrode in a composition comprising alcohol or ketone to expand said electrolyte membrane; and
   (c) separating said electrolyte membrane from said electrode after execution of said step (b).

2. A method in accordance with claim 1, said method further comprising:
   (d) substituting alcohol or ketone included in the separated electrolyte membrane by water after execution of said step (c); and
   (e) washing said electrolyte membrane after execution of said step (d).

3. A method in accordance with claim 2, said method further comprising:
   (g) irradiating said electrolyte membrane with a light beam after execution of said step (e);
   (h) measuring an intensity of transmitted light through said electrolyte membrane; and
   (i) optionally repeating said step (d) and (e).

4. A method in accordance with claim 1, wherein said step (c) further comprises:
   (c-1) executing one operation selected from the group consisting of: peeling said electrode off said electrolyte membrane; twisting said electrode relative to said electrolyte membrane; shifting said electrode relative to said electrolyte membrane; and rotating said electrode with respect to said electrolyte membrane.

5. A method in accordance with claim 1, wherein said step (b) further comprises:
   (b-1) applying a vibrating force to said composition, in which said electrolyte membrne nd electrode are soaked.

6. A method in accordance with claim 1, said method further comprising:
   (f) drying said electrolyte membrane and electrode prior to execution of said step (b).

7. A method in accordance with claim 1, wherein said electrode comprises a platinum-containing catalyst supported thereon, and said method further comprises the step of:
   (j) filtering said composition to recover platinum in said composition after execution of said step (b).

8. The method of claim 1, wherein composition comprises an selected from the group consisting of methanol, ethanol and isopropanol.

9. The method of claim 8, wherein said alcohol is methanol.

10. The method of claim 1, wherein said composition expands said membrane by not less than 20%.

11. The method of claim 1, wherein said composition expands the membrane by not less than 30%.

12. A method of recovering an electrolyte membrane from a fuel cell, said method comprising:
   (a) providing said electrolyte membrane and an electrode which are bonded with each other with a proton-conductive adhesive, (b) soaking said electrolyte membrane and electrode in a composition comprising alcohol or ketone to dissolve a solid material of said proton-conductive adhesive; and (c) separating said electrolyte membrane from said electrode after execution of said step (b).

13. A method in accordance with claim 12, wherein said composition expands said electrolyte membrane by not less than 20% in addition to dissolving the solid material of said proton-conductive adhesive.

14. The method of claim 13, wherein said alcohol is methanol.

15. The method of claim 13, wherein said composition expands said membrane by not less than 30%.

16. A method in accordance with claim 13, wherein said composition comprises methanol.

17. A method in accordance with claim 13, said method further comprising the steps of:

(d) substituting alcohol or ketone included in the separated electrolyte membrane by water after execution of said step (b); and (e) washing said electrolyte membrane after execution of said step (d).

18. The method of claim 12, wherein said composition comprises alcohol selected from the group consisting of methanol, ethanol and isopropanol.

19. A method of recovering electrolyte membranes from fuel cells, said method comprising the steps of:

(a) providing a stack of fuel cells comprising a plurality of electrolyte membranes and electrodes which are bonded with each other and which are under a set clamping pressure, said stack of fuel cells further comprising a flow path having an inlet and outlet for supplying a reactant gas to said electrodes, said flow path acting as a gas seal with the aid of said clamping pressure;

(b) reducing the clamping pressure while maintaining said gas seal;

(c) closing said outlet of said flow path;

(d) introducing a liquid to expand said electrolyte membranes into said stack of fuel cells via said inlet of said flow path; and (e) opening said outlet of said gas flow path.

20. The method of claim 19, wherein said liquid is selected from the group consisting of methanol, ethanol and isopropanol.

21. The method of claim 20, wherein said liquid is methanol.

22. A method of recovering electrolyte membranes from fuel cells, said method comprising the steps of:

(a) providing a stack of fuel cells comprising electrolyte membranes and electrodes which are bonded with each other with a proton-conductive adhesive and which are under a clamping pressure, said stack of fuel cells further comprising a flow path having an inlet and outlet for supplying a reactant gas to said electrodes, said flow path acting as a gas seal with the aid of said clamping pressure;

(b) reducing the clamping pressure while maintaining said gas seal;

(c) closing said outlet of said flow path;

(d) introducing a liquid to dissolve a solid material of said proton-conductive adhesive and to expand said electrolyte membranes into said stack of fuel cells via said inlet of said flow path; and (e) opening said outlet of said gas flow path.

23. The method of claim 22, wherein said liquid is selected from the group consisting of methanol, ethanol and isopropanol.

24. The method of claim 23, wherein said liquid is methanol.

25. The method of claim 22, wherein said liquid expands said membranes by not less than 20%.

26. The method of claim 22, wherein said liquid expands said membranes by not less than 30%.

27. An apparatus for recovering an electrolyte membrane from a fuel cell, said fuel cell comprising said electrolyte membrane and an electrode which are bonded with each other, said apparatus comprising:

a soaking tank filled with a composition comprising alcohol or ketone that expands said electrolyte membrane, said fuel cell being in said composition in said soaking tank; and separating means for separating said electrolyte membrane from said electrode.

28. An apparatus in accordance with claim 27, said apparatus further comprising:

a water tank filled with water; and a wash tank filled with a cleaning agent.

29. An apparatus in accordance with claim 27, wherein said soaking tank comprises means for applying a vibrating force to said composition in which said fuel cell is soaked.

30. An apparatus in accordance with claim 27, said apparatus further comprising:

means for drying said fuel cell prior to placing said fuel cell in said soaking tank.

31. An apparatus for recovering an electrolyte membrane from a fuel cell comprising said electrolyte membrane and an electrode which are bonded with each other with a proton-conductive adhesive, said apparatus comprising:

a soaking tank filled with a composition comprising alcohol or ketone that dissolves a solid material of said proton-conductive adhesive, said fuel cell being in said composition in said soaking tank; and separating means for separating said electrolyte membrane from said electrode of said unit cell.

32. An apparatus in accordance with claim 31, wherein said composition has an ability of expanding said electrolyte membrane by a factor greater than 20% in addition to the ability of dissolving the solid material of said proton-conductive adhesive.

33. An apparatus in accordance with claim 32, said apparatus further comprising:

a water tank filled with water; and a wash tank filled with a cleaning agent electrolyte membrane soaked in said water tank being further soaked in the cleaning agent in said wash tank.

34. An apparatus for recovering an electrolyte membrane from a fuel cell, said apparatus comprising liquid tank means filled with a composition comprising alcohol or ketone, fuel cell comprising said electrolyte membrane and an electrode and being in said composition in said liquid tank means, wherein said liquid tank means comprises a plurality of tanks connected in series via piping means, a supply source of said composition being connected to a last tank among said plurality of tanks along a feeding path of said unit cell, said tanks arranged such that composition overflowing an arbitrary tank among said plurality of tanks is introduced into a preceding tank along the feeding path of said unit cell.

* * * * *